US010758820B2

(12) United States Patent
Ueda et al.

(10) Patent No.: US 10,758,820 B2
(45) Date of Patent: Sep. 1, 2020

(54) GAME SYSTEM, STORAGE MEDIUM HAVING STORED THEREIN GAME PROGRAM, GAME APPARATUS, AND GAME PROCESSING METHOD

(71) Applicant: NINTENDO CO., LTD., Kyoto (JP)

(72) Inventors: Hiroshi Ueda, Kyoto (JP); Ichiro Suzuki, Kyoto (JP); Shintaro Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 126 days.

(21) Appl. No.: 15/986,011

(22) Filed: May 22, 2018

(65) Prior Publication Data
US 2019/0015744 A1    Jan. 17, 2019

(30) Foreign Application Priority Data
Jul. 12, 2017 (JP) ................................. 2017-136127

(51) Int. Cl.
*A63F 13/285* (2014.01)
*A63F 13/24* (2014.01)

(52) U.S. Cl.
CPC ............ *A63F 13/285* (2014.09); *A63F 13/24* (2014.09); *A63F 2300/1037* (2013.01); *A63F 2300/64* (2013.01)

(58) Field of Classification Search
CPC .............................................. A63F 2300/1037
See application file for complete search history.

(56) References Cited

U.S. PATENT DOCUMENTS

| 5,734,373 | A | * | 3/1998 | Rosenberg | A63F 13/06 345/161 |
| 5,857,986 | A | * | 1/1999 | Moriyasu | A61H 23/02 273/148 B |
| 5,897,437 | A | * | 4/1999 | Nishiumi | A63F 13/02 463/47 |

(Continued)

FOREIGN PATENT DOCUMENTS

| JP | 11-33229 | 2/1999 |
| JP | 2002-35421 | 2/2002 |

(Continued)

OTHER PUBLICATIONS

Notice of Reasons for Refusal dated Oct. 8, 2019 issued in Japanese Application No. 2017-136127 (3 pgs.).

*Primary Examiner* — Steven J Hylinski
(74) *Attorney, Agent, or Firm* — Nixon & Vanderhye PC

(57) ABSTRACT

Based on a user operation on an operation unit, an operation target is controlled in a virtual space, and it is determined whether or not the operation target is in a predetermined situation in the virtual space. Then, a vibration signal for vibrating a vibration unit is generated in accordance with the state of the operation target in the virtual space, and the vibration signal is generated by associating a plurality of types of vibrations with a plurality of states of the operation target. When it is determined that the operation target is in the predetermined situation, the vibration signal is generated so that regarding a first type of vibration among the plurality of types of vibrations, the vibration is weaker than in a case where it is not determined that the operation target is in the predetermined situation, or the vibration disappears.

36 Claims, 19 Drawing Sheets

(56) References Cited

U.S. PATENT DOCUMENTS

| | | | | |
|---|---|---|---|---|
| 5,999,168 | A * | 12/1999 | Rosenberg | A63F 13/06 345/161 |
| 6,001,014 | A * | 12/1999 | Ogata | A63F 13/02 463/37 |
| 6,147,674 | A * | 11/2000 | Rosenberg | B25J 9/1689 345/157 |
| 6,679,776 | B1 * | 1/2004 | Nishiumi | A63F 13/06 463/36 |
| 6,864,877 | B2 * | 3/2005 | Braun | G06F 3/016 345/156 |
| 9,594,444 | B2 * | 3/2017 | Bae | G06F 3/041 |
| 9,753,537 | B2 * | 9/2017 | Obana | G06F 3/016 |
| 9,764,357 | B2 * | 9/2017 | Houston | B06B 1/166 |
| 9,833,702 | B2 * | 12/2017 | Obana | G06F 3/011 |
| 10,135,412 | B2 * | 11/2018 | Obana | H03G 3/04 |
| 10,471,346 | B2 * | 11/2019 | Yamashita | A63F 13/25 |
| 2001/0016518 | A1 * | 8/2001 | Nishiumi | A63F 13/06 463/36 |
| 2002/0080112 | A1 * | 6/2002 | Braun | G06F 3/016 345/156 |
| 2003/0090460 | A1 * | 5/2003 | Schena | A63F 13/06 345/156 |
| 2006/0046843 | A1 * | 3/2006 | Nakajima | A63F 13/06 463/30 |
| 2006/0290662 | A1 * | 12/2006 | Houston | A63F 13/06 345/156 |
| 2007/0285216 | A1 * | 12/2007 | Tierling | A63F 13/06 340/407.1 |
| 2010/0085693 | A1 | 4/2010 | Koshiishi | |
| 2010/0245232 | A1 * | 9/2010 | Birnbaum | A63F 13/06 345/156 |
| 2013/0038603 | A1 * | 2/2013 | Bae | G06F 3/016 345/419 |
| 2015/0209668 | A1 * | 7/2015 | Obana | G06F 3/011 463/31 |
| 2015/0268722 | A1 * | 9/2015 | Wang | G06F 3/016 345/156 |
| 2015/0355711 | A1 * | 12/2015 | Rihn | A63F 13/5252 340/407.2 |
| 2016/0192067 | A1 | 6/2016 | Obana et al. | |
| 2017/0087458 | A1 * | 3/2017 | Nakagawa | G06F 3/165 |
| 2018/0345131 | A1 * | 12/2018 | Yamashita | A63F 13/25 |

FOREIGN PATENT DOCUMENTS

| | | |
|---|---|---|
| JP | 2006-68210 | 3/2006 |
| JP | 2010-82396 | 4/2010 |
| JP | 2016-123513 | 7/2016 |

* cited by examiner

F I G. 1 2
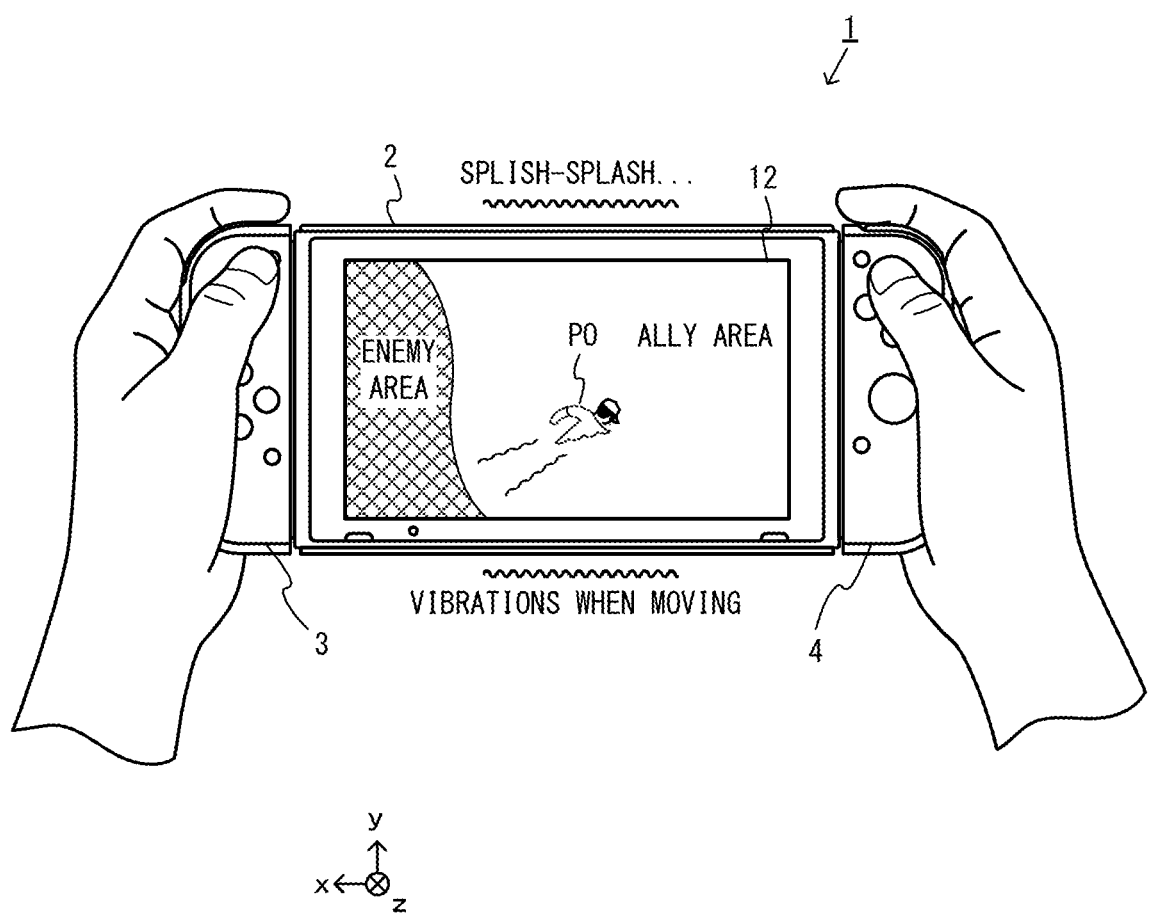

FIG. 13

|  | ADJUSTMENT COEFFICIENT |
| --- | --- |
| AT START OF GAME | 1.0 |
| FOUND BY ENEMY | FADED OUT FROM 1.0 TO 0.0 (60 FRAMES) |
| COME CLOSE TO ENEMY | 1.0 TO 0.0 IN ACCORDANCE WITH DISTANCE (30m:1.0, 10m:0.0) |
| ENEMY DISAPPEARS | FADED IN FROM 0.0 TO 1.0 (180 FRAMES) |

FIG. 14

|  | ADJUSTMENT COEFFICIENT |
| --- | --- |
| AT START OF GAME | 1.0 |
| LAPSE OF TIME (60 FRAMES OR MORE) | FADED OUT FROM 1.0 TO 0.0 (240 FRAMES) |
| MOVING DISTANCE TO ENEMY'S CAMP | 1.0 TO 0.0 IN ACCORDANCE WITH DISTANCE (0m:1.0, 40m:0.0) |

FIG. 15

|  | ADJUSTMENT COEFFICIENT |
| --- | --- |
| AT START OF GAME | 1.0 |
| START OF ENEMY APPEARANCE EVENT | FADED OUT FROM 1.0 TO 0.0 (300 FRAMES) |
| END OF ENEMY APPEARANCE EVENT | FADED IN FROM 0.0 TO 1.0 (300 FRAMES) |

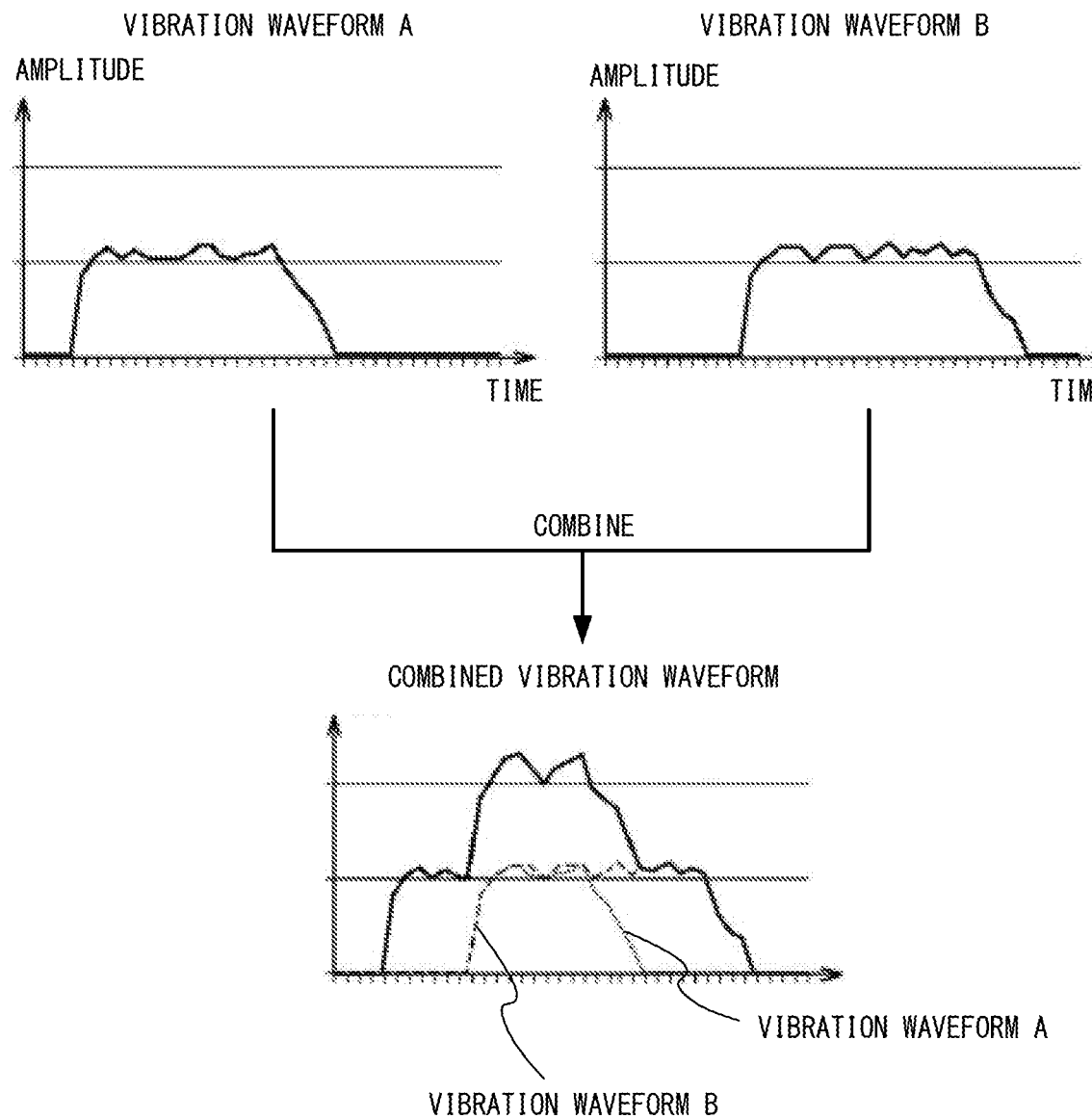
F I G. 1 8

F I G. 2 0
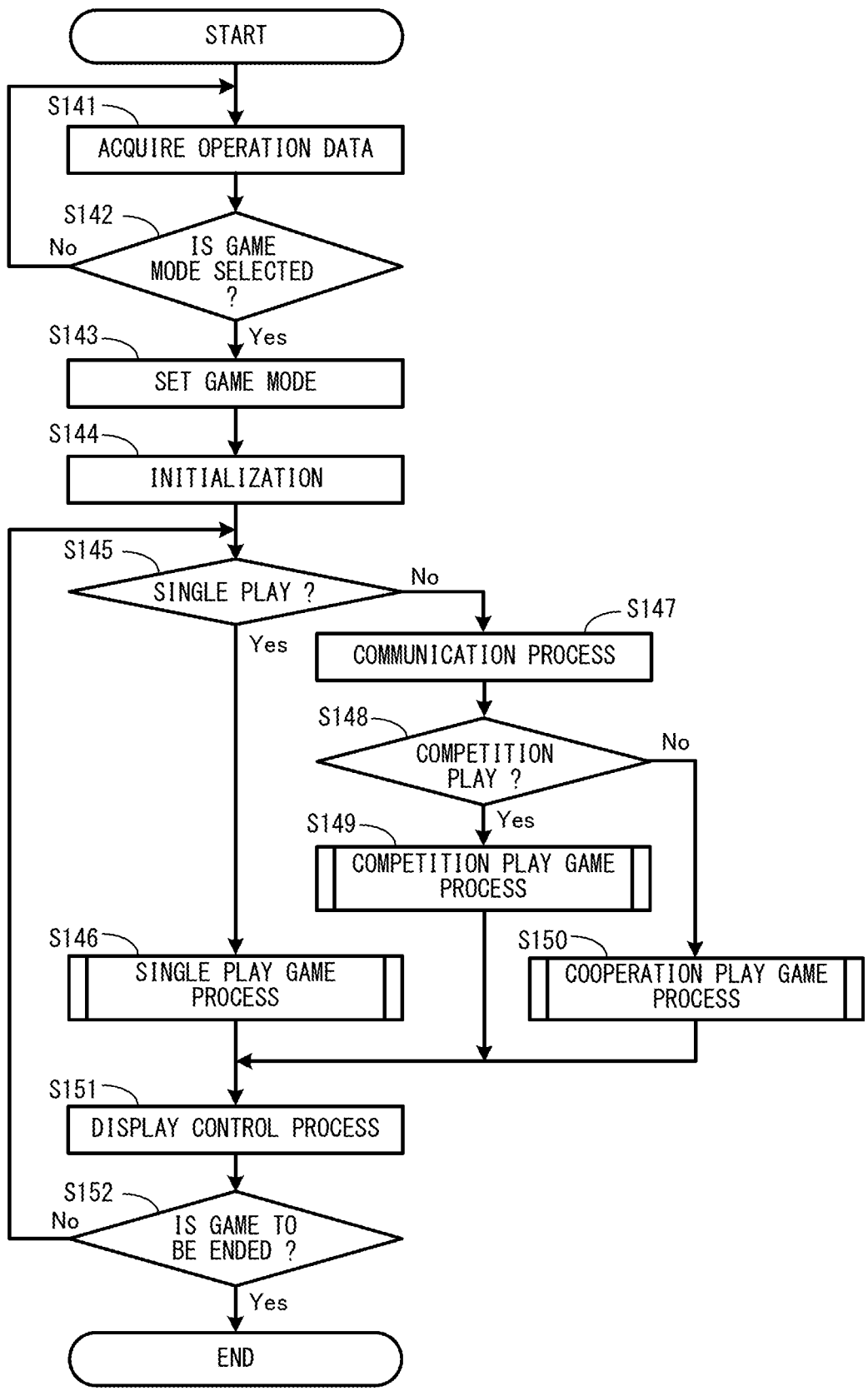

GAME SYSTEM, STORAGE MEDIUM HAVING STORED THEREIN GAME PROGRAM, GAME APPARATUS, AND GAME PROCESSING METHOD

CROSS REFERENCE TO RELATED APPLICATION

The disclosure of Japanese Patent Application No. 2017-136127, filed on Jul. 12, 2017, is incorporated herein by reference.

FIELD

The technology shown here relates to a game system, a storage medium having stored therein a game program, a game apparatus, and a game processing method for vibrating a vibration section.

BACKGROUND AND SUMMARY

Conventionally, there is a game system for, when a condition for generating a vibration is satisfied, driving a vibration section.

In the game system, however, in a case where it is assumed that the vibration section is vibrated by a plurality of vibrations when a plurality of conditions for generating a vibration are satisfied, it may be difficult to distinguish each vibration, and therefore, it may be difficult to distinguish a necessary vibration.

Therefore, it is an object of an exemplary embodiment to provide a game system, a storage medium having stored therein a game program, a game apparatus, and a game processing method that are capable of, when vibrating a vibration section, making a vibration necessary for a user easily distinguishable.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a game system according to an exemplary embodiment, a game system includes an operation unit, a vibration unit, and an information processing unit. The information processing unit includes a computer configured to: based on a user operation on the operation unit, control an operation target in a virtual space; determine whether or not the operation target is in a predetermined situation in the virtual space; and in accordance with a state of the operation target in the virtual space, generate a vibration signal for vibrating the vibration unit. In the generation of the vibration signal, the vibration signal is generated by associating a plurality of types of vibrations with a plurality of states of the operation target. When it is determined in the determination that the operation target is in the predetermined situation, the vibration signal is generated so that regarding a first type of vibration among the plurality of types of vibrations, the vibration is weaker than in a case where it is not determined that the operation target is in the predetermined situation, or the vibration disappears.

Based on the above, when an operation target is in a predetermined situation in a virtual space, it is possible to cause a user to perceive a necessary vibration in an easily understandable manner.

Further, in the control of the operation target, a player character object in the virtual space may be controlled as the operation target. The computer of the information processing unit may be further configured to control a behavior of an enemy object attacking the player character object in the virtual space. In the determination, based on a state of the enemy object, it may be determined whether or not the player character object is during a fight, and when the player character object is during the fight, it may be determined that the player character object is in the predetermined situation.

Based on the above, when a player character object is during a fight against an enemy object in the virtual space, it is possible to cause the user to perceive a necessary vibration in an easily understandable manner. Further, based on the state of the enemy object, it is possible to easily determine whether or not the player character object is during a fight.

Further, in the control of the enemy object, based on a predetermined condition, a process for the enemy object to attack the player character object may be started. In the determination, when the process for the enemy object to attack the player character object is performed in the control of the enemy object, it may be determined that the player character object is during the fight.

Based on the above, based on whether or not the enemy object is performing a process for attacking the player character object, it is determined whether or not the player character object is during a fight against the enemy object. Thus, it is possible to easily determine whether or not the player character object is during a fight.

Further, in the determination, when a distance between the enemy object and the player character object in the virtual space is smaller than a predetermined value, it may be determined that the player character object is during the fight.

Based on the above, based on the distance between the enemy object and the player character object, it is determined whether or not the player character object is during a fight against the enemy object. Thus, it is possible to easily determine whether or not the player character object is during a fight.

Further, in the control of the operation target, after a predetermined start timing, based on a user operation on the operation unit, a player character object in the virtual space may be controlled as the operation target. In the determination, after a predetermined time elapses from the start timing, it may be determined that the player character object is during a fight, and when the player character object is during the fight, it may be determined that the player character object is in the predetermined situation.

Based on the above, based on the lapse of time, it is determined whether or not a player character object is during a fight against an enemy object. Thus, it is possible to easily determine whether or not the player character object is during a fight.

Further, the computer of the information processing unit may be further configured to: perform wireless or wired communication with another game system; and after the start timing and based on data from the other game system acquired in the performance of the communication, control another player character object operated by another user.

Based on the above, even in a multi-game where a game progresses by communicating with another game system, it is possible to cause the user to perceive a necessary vibration in an easily understandable manner.

Further, in the generation of the vibration signal, the vibration signal may be generated so that when an event where the operation target becomes damaged occurs in the virtual space, the vibration unit generates a predetermined vibration as a second type of vibration other than the first type of vibration.

Based on the above, based on a vibration, the user can know that the operation target encounters an event where the operation target becomes damaged.

Further, in the generation of the vibration signal, the vibration signal may be generated so that when the operation target attacks another target in the virtual space, the vibration unit generates a predetermined vibration as a second type of vibration other than the first type of vibration.

Based on the above, based on a vibration, the user can know that the operation target makes an attack.

Further, in the generation of the vibration signal, the vibration signal may be generated so that when the operation target enters an area satisfying a first condition in the virtual space, the vibration unit generates a predetermined vibration as the first type of vibration.

Based on the above, based on a vibration, the user can know that the operation target is placed in an area satisfying a first condition.

Further, in the generation of the vibration signal, the vibration signal may be generated so that when the operation target enters an area satisfying a second condition in the virtual space, the vibration unit generates a predetermined vibration as a second type of vibration other than the first type of vibration.

Based on the above, based on a vibration, the user can know that the operation target is placed in an area satisfying a second condition, in priority to the fact that the operation target is placed in an area satisfying a first condition.

Further, in the generation of the vibration signal, the vibration signal may be generated so that in accordance with the fact that the operation target moves in the virtual space, the vibration unit generates a predetermined vibration as the first type of vibration.

Based on the above, a vibration is generated in accordance with the fact that the operation target moves. Thus, it is possible to cause the user to feel the reality of the movement.

Further, in the generation of the vibration signal, the vibration signal may be generated so that in a predetermined period after it is determined that the operation target is in the predetermined situation, an intensity of the first type of vibration weakens with a lapse of time.

Based on the above, when a vibration is weakened, the vibration fades out. Thus, it is possible to adjust the intensity of the vibration without giving discomfort to the user.

Further, in the generation of the vibration signal, a vibration signal indicating a vibration waveform of a vibration corresponding to the state of the operation target may be generated. When a plurality of vibrations are simultaneously generated in accordance with the state of the operation target, a vibration signal indicating a waveform obtained by combining vibration waveforms of the vibrations may be generated.

Based on the above, when a plurality of vibrations are simultaneously generated, it is possible to cause the user to perceive each vibration without lacking any of the vibrations.

Further, in the control of the operation target, after a predetermined start timing, based on a user operation on the operation unit, a player character object in the virtual space may be controlled as the operation target. The computer of the information processing unit may be further configured to, after the start timing, cause an enemy object attacking the player character object to appear in the virtual space. In the determination, after the enemy object appears in the virtual space, it may be determined that the player character object is during a fight, and when the player character object is during the fight, it may be determined that the player character object is in the predetermined situation.

Based on the above, when an enemy object appears, it is determined that a player character object is during a fight against the enemy object. Thus, it is possible to easily determine whether or not the player character object is during a fight.

Further, the exemplary embodiment may be carried out in the forms of a storage medium having stored therein a game program, a game apparatus, and a game processing method.

According to the exemplary embodiment, when an operation target is in a predetermined situation in a virtual space, it is possible to cause a user to perceive a necessary vibration in an easily understandable manner.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 12 is a diagram showing a non-limiting example of the state where an operation is performed by attaching the left controller 3 and the right controller 4 to the main body apparatus 2;

FIG. 13 is a diagram showing non-limiting examples of the settings of an adjustment coefficient in a single play mode;

FIG. 14 is a diagram showing non-limiting examples of the settings of an adjustment coefficient in a competition play mode;

FIG. 15 is a diagram showing non-limiting examples of the settings of an adjustment coefficient in a cooperation play mode;

FIG. 18 is a diagram illustrating a non-limiting example of a method for generating vibration data by an addition method;

FIG. 20 is a flow chart showing a non-limiting example of game processing executed by the game system 1;

DETAILED DESCRIPTION OF NON-LIMITING EXAMPLE EMBODIMENTS

A game system, a game system, a game program, a game apparatus, and a game processing method according to an example of an exemplary embodiment are described below. A game system 1, which is an example of the game system according to the exemplary embodiment, includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
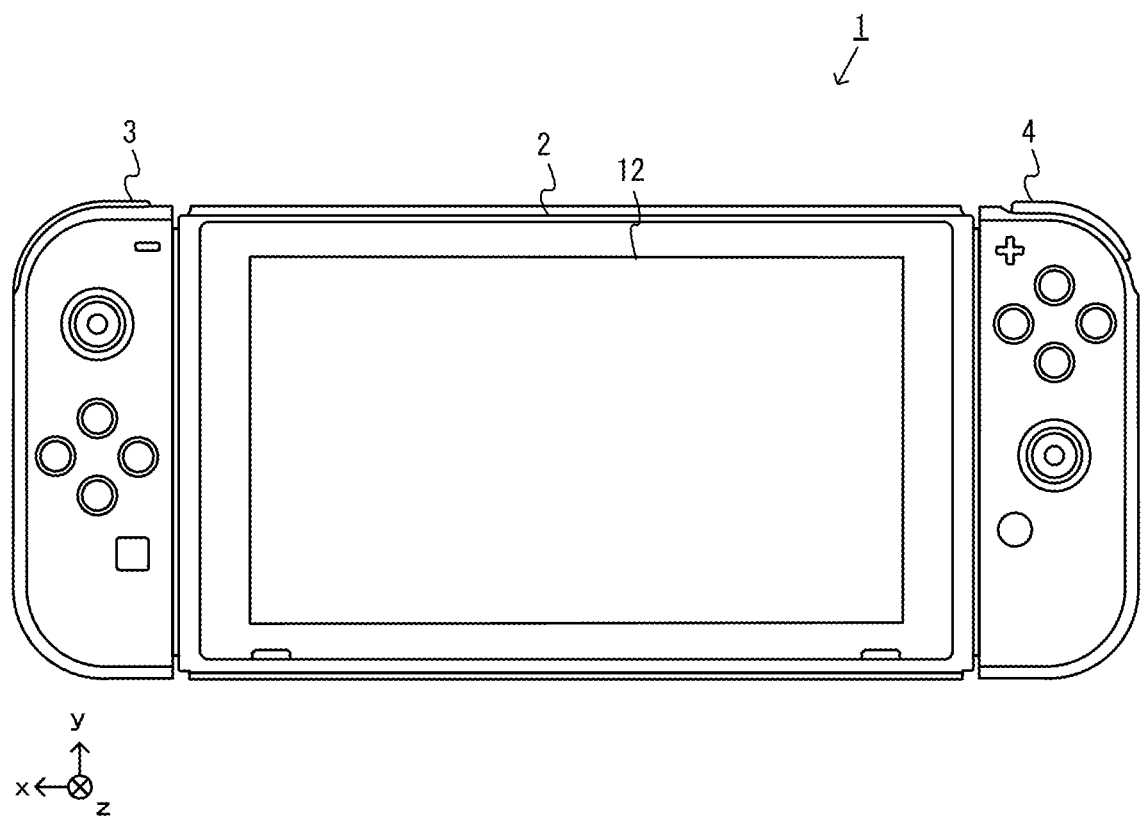
FIG. 1 is a diagram showing a non-limiting example of the state where a left controller 3 and a right controller 4 are attached to a main body apparatus 2 in an example of a game system 1 according to an exemplary embodiment.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
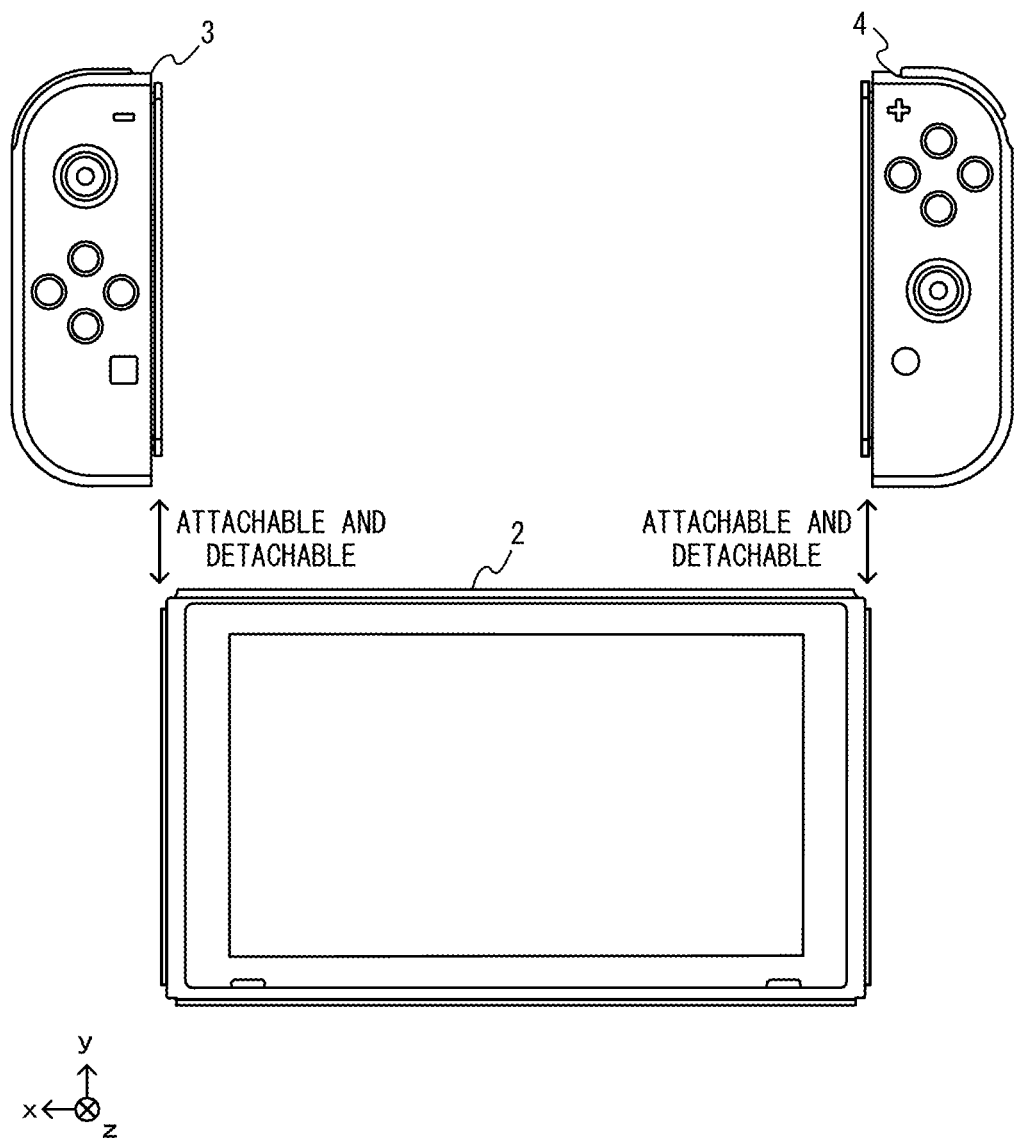
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
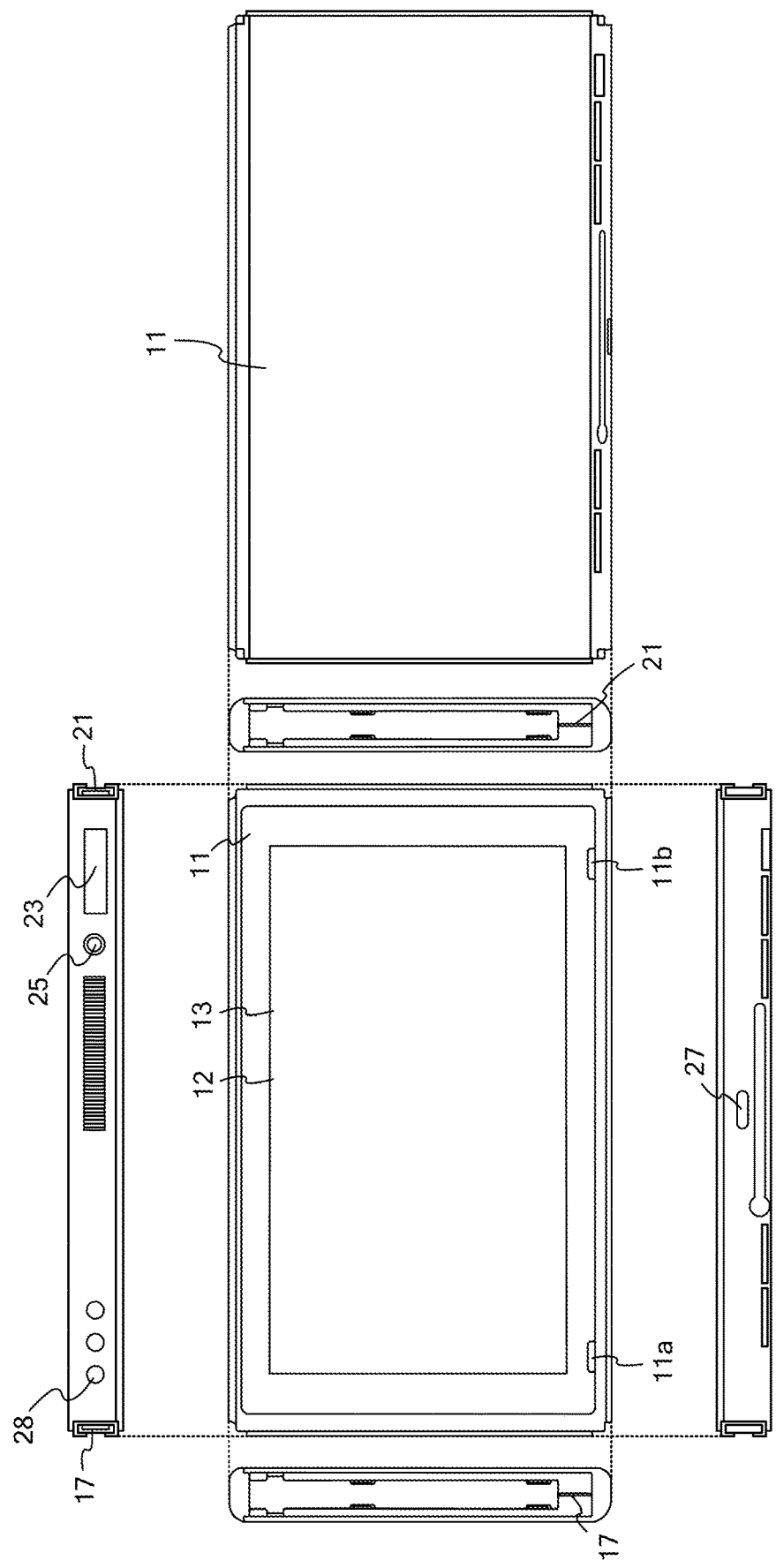
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
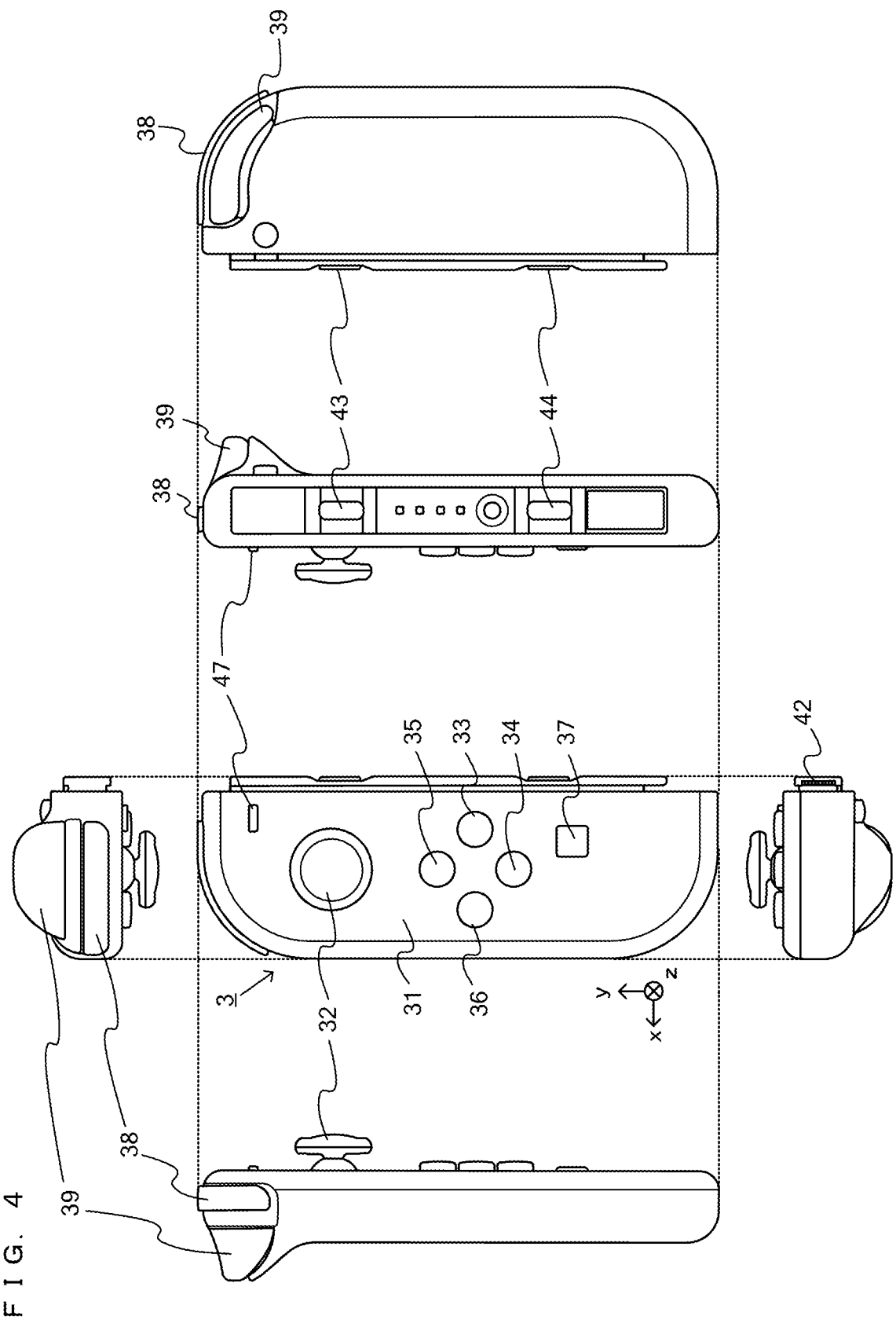
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
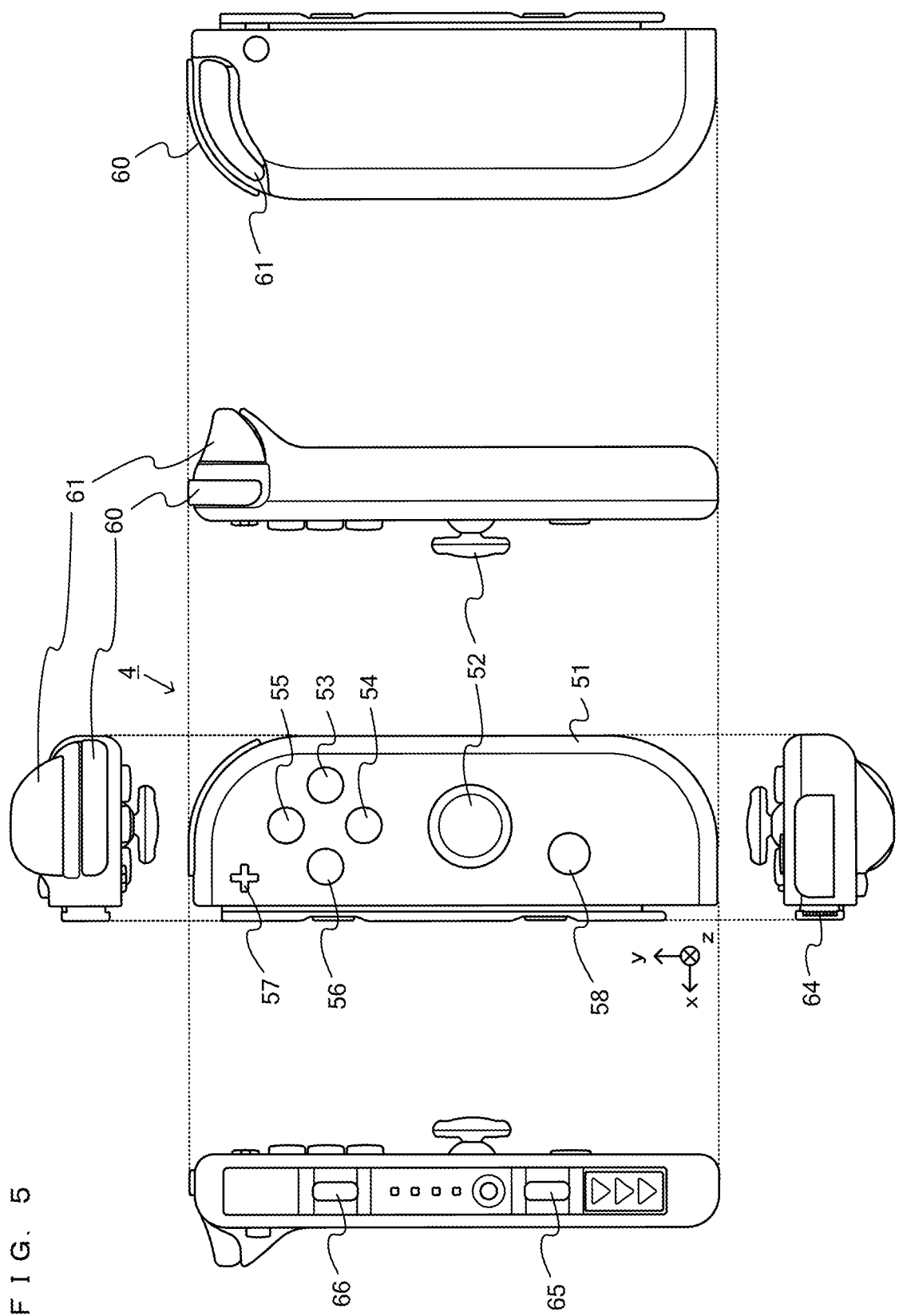
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
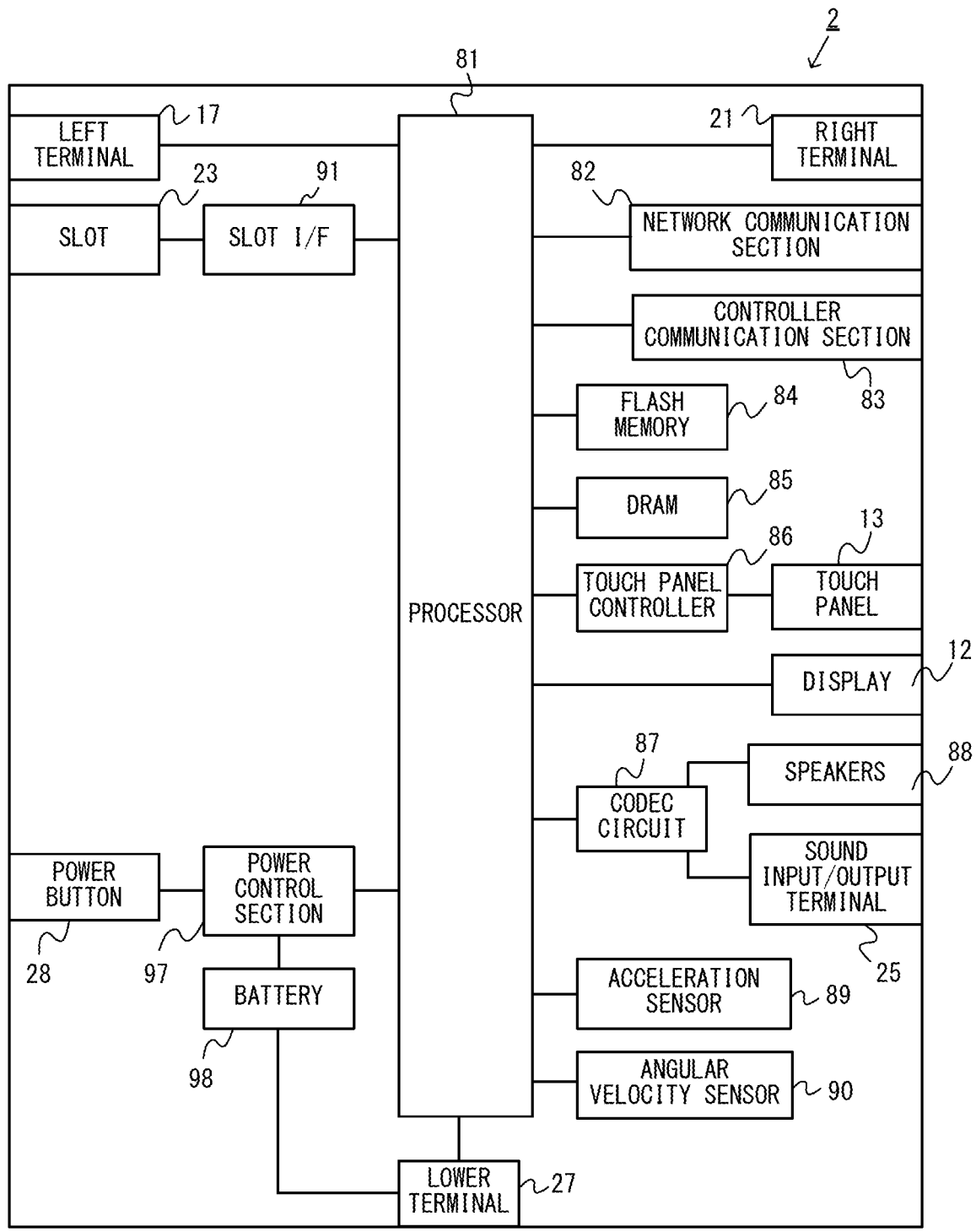
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
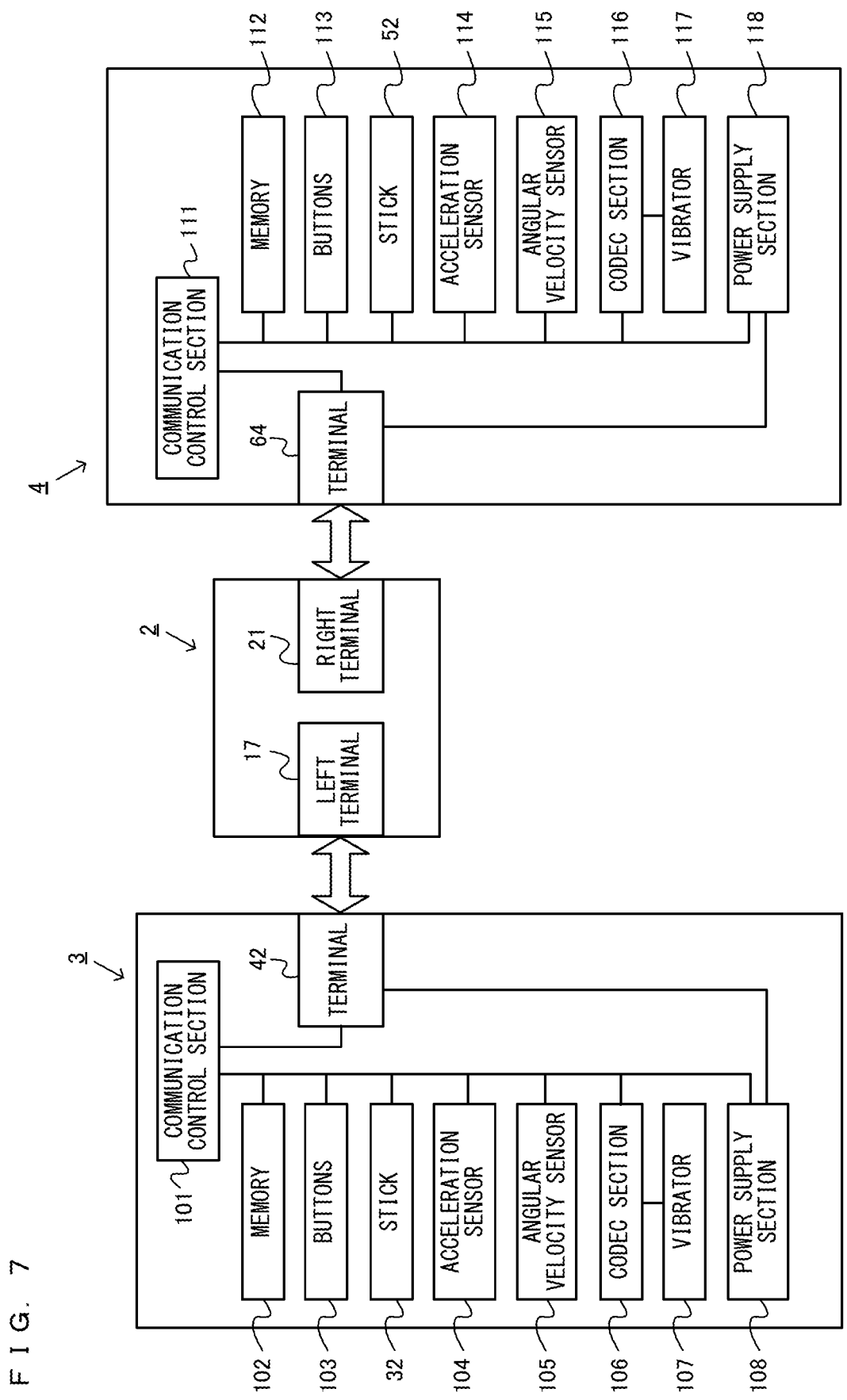
FIG. 7 is a block diagram showing a non-limiting example of the internal configuration of the game system 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to the stationary monitor. As an example, a description is given below using a game system in a use form in which an image is output to the display 12 in the state of the unified apparatus obtained by attaching the left controller 3 and the right controller 4 to the main body apparatus 2. As a form in a case where an operation is performed on an application (e.g., a game application) in this state, a form in which a single user uses both the left controller 3 and the right controller 4 is possible.

FIGS. 8 to 12 are diagrams showing examples of the state where an operation is performed by attaching the left controller 3 and the right controller 4 to the main body apparatus 2. As shown in FIGS. 8 to 12, when game play is performed by attaching the left controller 3 and the right controller 4 to the main body apparatus 2, a game image is displayed on the display 12 of the main body apparatus 2. When a game is played using such a unified apparatus, as an example, an operation is performed using the operation buttons and the sticks provided in the left controller 3 and the right controller 4. As another example, an operation is performed by the inertial sensors detecting the operation of changing or moving the orientation of the entirety of the unified apparatus. Then, the user can view an image displayed on the display 12 while performing an operation by holding a portion of the left controller 3 attached to the main body apparatus 2 with their left hand and holding a portion of the right controller 4 attached to the main body apparatus 2 with their right hand.

Further, in the exemplary embodiment, when game play is performed by the user holding the left controller 3 and the right controller 4, vibrations are imparted to the left controller 3 and/or the right controller 4 in accordance with the situation of the game. As described above, the left controller 3 includes the vibrator 107, and the right controller 4 includes the vibrator 117. The processor 81 of the main body apparatus 2 transmits vibration data to the left controller 3 and/or the right controller 4 in accordance with the situation of the game that is being executed by the processor 81, and thereby can vibrate the vibrator 107 and/or the vibrator 117 at an amplitude and a frequency corresponding to the vibration data.

Figure 8:
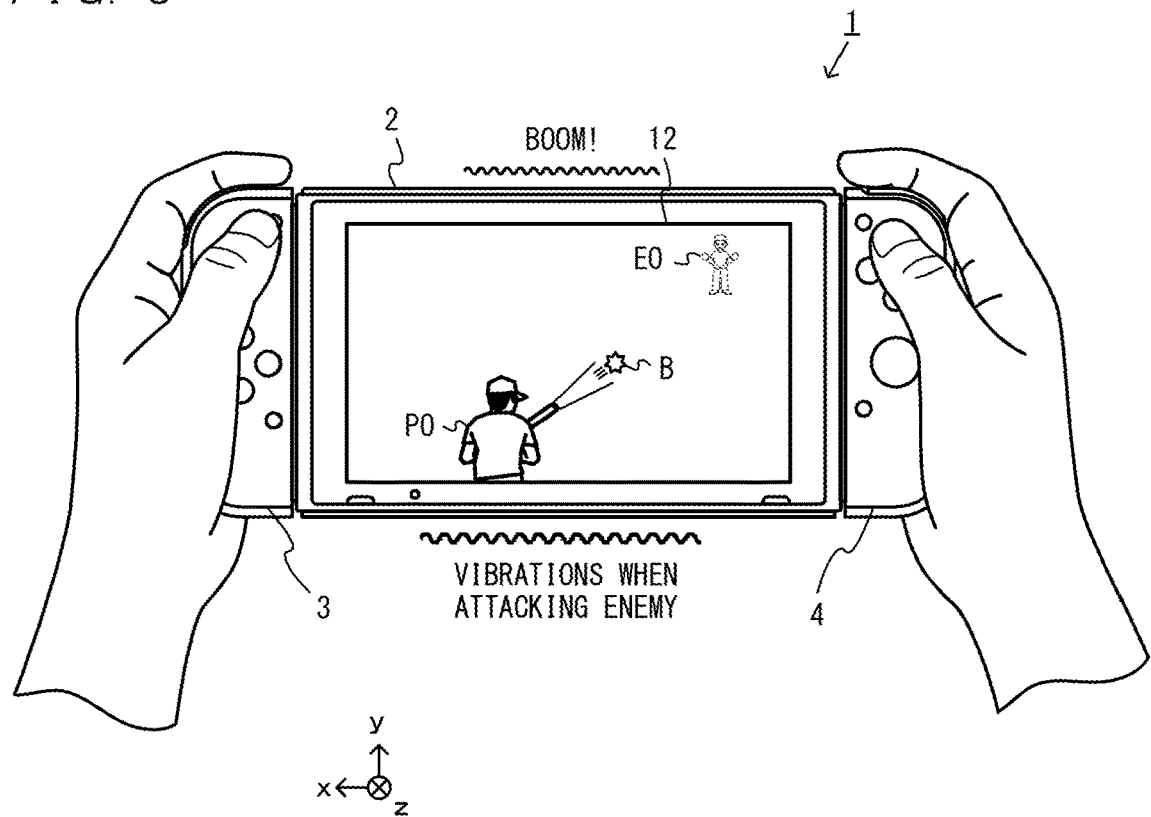
FIG. 8 is a diagram showing a non-limiting example of the state where an operation is performed by attaching the left controller 3 and the right controller 4 to the main body apparatus 2.

As shown in FIG. 8, in this exemplary game, an image of a game (e.g., a fighting game) where a player object PO and an enemy object EO compete against each other is displayed on the display 12. Then, the user operating the left controller 3 and the right controller 4 can operate the player object PO by moving the entirety of the unified apparatus, or changing the orientation of the entirety of the unified apparatus, or pressing the operation buttons, or tilting the analog sticks. It should be noted that in the case of a game in a single play mode described later or a game in a cooperation play mode described later, the action of the enemy object EO is automatically controlled by a CPU (e.g., the processor 81). In the case of a competition play mode described later, the action of the enemy object EO is controlled by an operation of a user of another game system 1 capable of communicating with the game system 1.

For example, a predetermined operation button (e.g., the first R-button 60) is pressed, whereby the player object PO displayed on the display 12 makes an attack. For example, when a weapon owned by the player object PO is directed at the enemy object EO, and if the predetermined operation button is pressed, a bullet B is fired from the weapon to the enemy object EO. Then, in this exemplary game, when the player object PO performs the action of making an attack, vibrations corresponding to the type of the attack action are imparted to the left controller 3 and/or the right controller 4. Thus, based on the game image displayed on the display 12, the user can visually confirm that the player object PO performs the action of making an attack, and also based on the vibrations imparted by the left controller 3 and/or the right controller 4, the user can know that the player object PO performs the action of making an attack.

For example, in the example shown in FIG. 8, the user changes the direction of the player object PO in accordance with the direction in which the analog stick 32 is tilted. Then, the user presses the first R-button 60, whereby the bullet B is fired to the enemy object EO. When such an operation of attacking the enemy object EO is performed, vibrations corresponding to this attack (e.g., vibrations giving a tactile sensation "boom!" to the user) are imparted to the left controller 3 and/or the right controller 4. The user perceives the vibrations imparted by the left controller 3 and/or the right controller 4 and corresponding to the attack and thereby can also know that the player object PO performs the action of attacking the enemy object EO.

Figure 9:
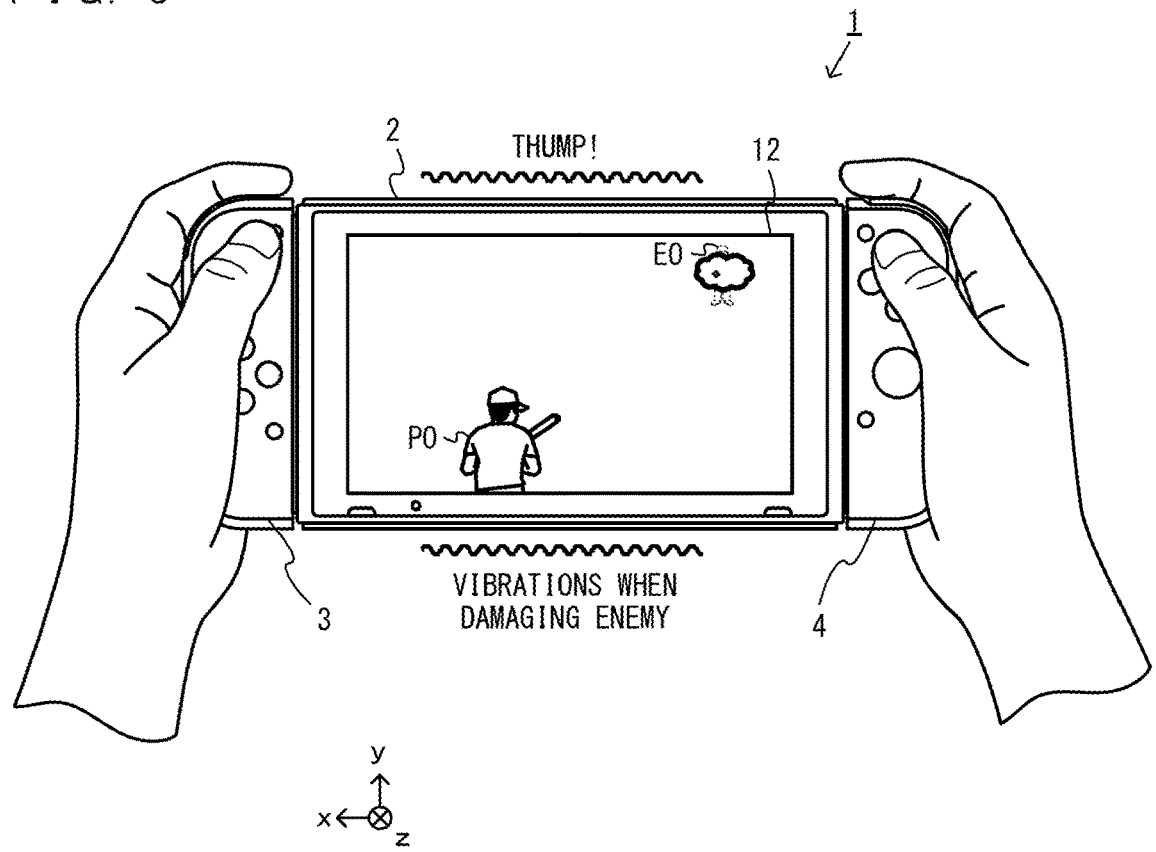
FIG. 9 is a diagram showing a non-limiting example of the state where an operation is performed by attaching the left controller 3 and the right controller 4 to the main body apparatus 2.

Further, as shown in FIG. 9, when the attack of the player object PO damages the enemy object EO, vibrations corresponding to the type of the attack, the distance from the position of the attack, the amount of the caused damage, whether or not the enemy is defeated (e.g., disappears from a virtual space), or the like are imparted to the left controller 3 and/or the right controller 4. Thus, based on the game image displayed on the display 12, the user can visually confirm that the attack of the player object PO influences the enemy object EO, and also based on the vibrations imparted by the left controller 3 and/or the right controller 4, the user can know that the attack of the player object PO influences the enemy object EO.

As an example, when the attack of the player object PO damages the enemy object EO, vibrations corresponding to the attack made by the player object PO (e.g., vibrations giving a tactile sensation "thump!" to the user) are imparted to the left controller 3 and/or the right controller 4, and vibrations different from the vibrations imparted when the player object PO makes an attack are imparted. Thus, the user perceives the vibrations imparted by the left controller 3 and/or the right controller 4 and corresponding to the attack made by the player object PO and thereby can also know that the attack of the player object PO influences the enemy object EO, or know the situation of the attack (the type of the attack, the closeness of the attack, the amount of the caused damage, whether or not the enemy is defeated, or the like).

Figure 10:
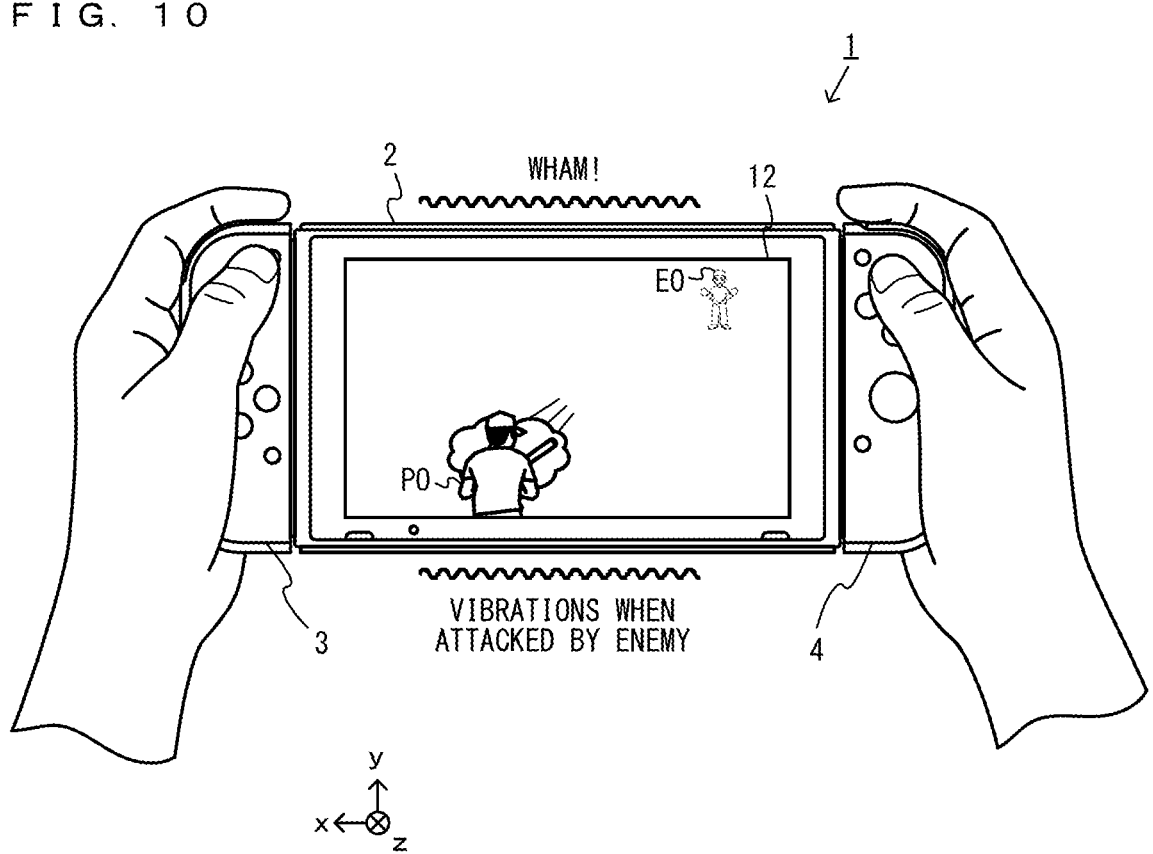
FIG. 10 is a diagram showing a non-limiting example of the state where an operation is performed by attaching the left controller 3 and the right controller 4 to the main body apparatus 2.

On the other hand, as shown in FIG. 10, the player object PO may be attacked by the enemy object EO. When the player object PO is attacked by the enemy object EO, vibrations corresponding to the type of the attack, the distance from the position of the attack, the amount of the caused damage, whether or not the player object PO is defeated by the enemy (e.g., the state where the game cannot continue, or the game is over), or the like are imparted to the left controller 3 and/or the right controller 4. Thus, based on the game image displayed on the display 12, the user can visually confirm that the player object PO is attacked by the enemy object EO, and also based on the vibrations imparted by the left controller 3 and/or the right controller 4, the user can know that the player object PO is attacked by the enemy object EO.

As an example, when the player object PO is attacked by the enemy object EO, vibrations corresponding to the attack received by the player object PO (e.g., vibrations giving a tactile sensation "wham!" to the user) are imparted to the left controller 3 and/or the right controller 4, and vibrations different from the vibrations imparted when the player object PO makes an attack are imparted. Thus, the user perceives the vibrations imparted by the left controller 3 and/or the right controller 4 and corresponding to the attack received by the player object PO and thereby can also know that the player object PO is attacked by the enemy object EO, or know the situation of the attack (the type of the attack, the closeness of the attack, the amount of the caused damage, whether or not the player object PO is defeated by the enemy, or the like).

Figure 11:
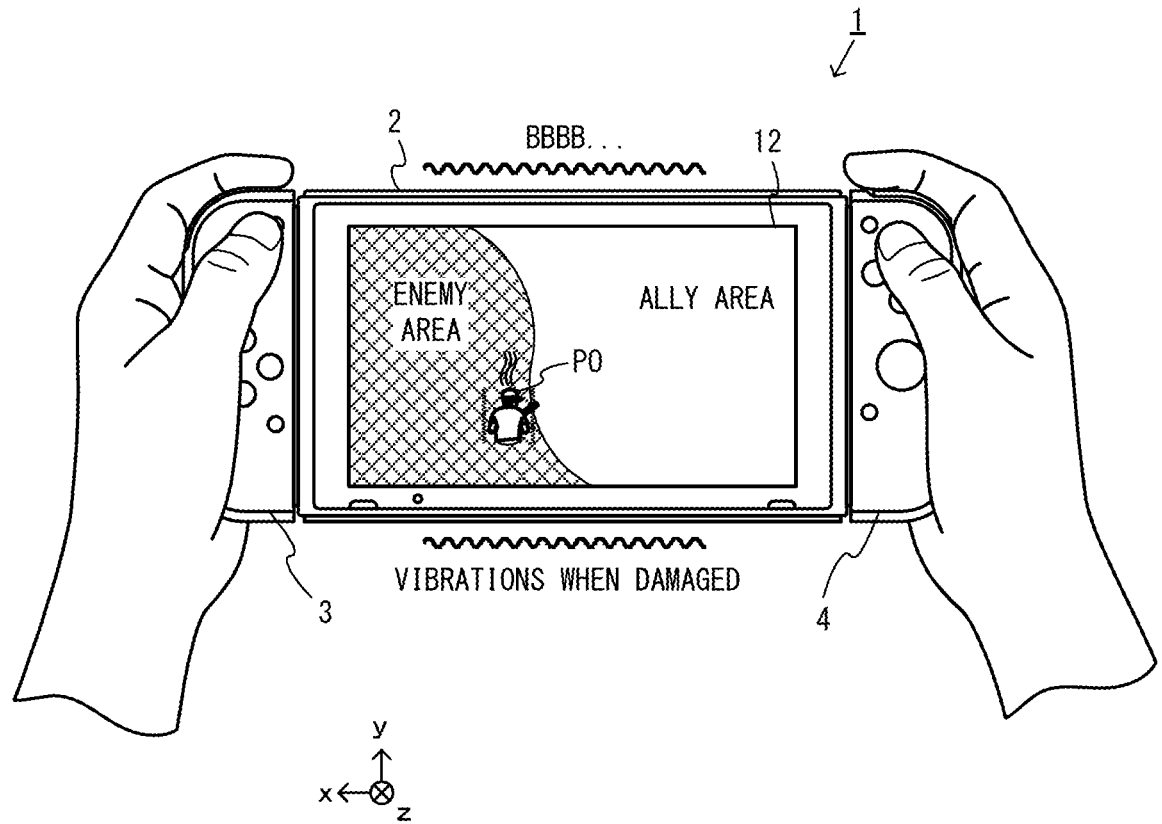
FIG. 11 is a diagram showing a non-limiting example of the state where an operation is performed by attaching the left controller 3 and the right controller 4 to the main body apparatus 2.

Further, as shown in FIG. 11, the player object PO may become damaged by moving in the virtual space. For example, in this exemplary game, in a game field placed in the virtual space, an "ally area", an "enemy area", and a "neutral area" are set. When the player object PO enters the "enemy area", predetermined damage is caused on the player object PO. Further, when the enemy object EO enters the "ally area", predetermined damage is caused on the enemy object EO. As described above, when the player object PO becomes damaged, vibrations corresponding to the type of a target causing the damage, the distance from the target, the amount of the caused damage, whether or not the player object PO is defeated by this damage (e.g., the state where the game cannot continue, or the game is over), or the like are imparted to the left controller 3 and/or the right controller 4. Thus, based on the game image displayed on the display 12, the user can visually confirm that the player object PO becomes damaged, and also based on the vibrations imparted by the left controller 3 and/or the right controller 4, the user can know that the player object PO becomes damaged.

As an example, when the player object PO becomes damaged in the virtual space, vibrations corresponding to the damage received by the player object PO (e.g., vibrations giving a tactile sensation "bbbb . . ." to the user) are imparted to the left controller 3 and/or the right controller 4, and vibrations different from the vibrations imparted when the player object PO makes an attack or is attacked are imparted. Thus, the user perceives the vibrations imparted by the left controller 3 and/or the right controller 4 and corresponding to the damage received by the player object PO and thereby can also know that the player object PO becomes damaged, or know the situation of the damage (the type of the damage, the closeness to the area where the player object PO becomes damaged, the amount of the caused damage, whether or not the player object PO is defeated by the caused damage, or the like). It should be noted that the situation where the player object PO becomes damaged by moving in the virtual space may be other than the case where the player object PO enters the "enemy area". For example, damage may be caused on the player object PO in various situations in the virtual space such as the situations where the player object PO falls, becomes submerged, falls over, becomes caught, crashes, fails in an action, and becomes shocked.

As described above, all the above vibrations (the vibrations when the player object PO makes an attack, the vibrations when the attack influences the enemy, the vibrations when the player object PO is attacked, and the vibrations when the player object PO becomes damaged) are related to a game element when the game is advanced, and can convey important information to the user. As an example, when a game where the player object PO and the enemy object EO fight against each other is performed, all the above vibrations can convey information necessary for play to win the fight to the user. Thus, it is necessary to cause the user to preferentially perceive the vibrations so as not to impair the game element. Meanwhile, to cause the user to feel the reality of the game, or to perform game staging, the user may be caused to perceive another type of vibration (hereinafter referred to as a "staging vibration").

As an example of the staging vibration, there is a vibration generated in accordance with the fact that the player object PO moves in the virtual space. For example, as shown in FIG. 12, in the "ally area" set in the game field, the player object PO can move by swimming. When the player object PO thus moves in the virtual space, vibrations corresponding to the movement are imparted to the left controller 3 and/or the right controller 4. Thus, based on the game image displayed on the display 12, the user can visually confirm that the player object PO is moving, and also based on the vibrations imparted by the left controller 3 and/or the right controller 4, it is possible to give the reality of the movement to the user.

As an example, when the player object PO moves by swimming in the virtual space, vibrations corresponding to the movement method of the player object PO (e.g., vibrations giving a tactile sensation "splish-splash" to the user) are imparted to the left controller 3 and/or the right controller 4, and vibrations different from the above vibrations regarding the game element are imparted. Thus, the user perceives the vibrations imparted by the left controller 3 and/or the right controller 4 and thereby can know the movement situation of the player object PO, the environment where the player object PO is placed, or the like, and also feel the reality of the player object PO placed in the virtual space. It should be noted that the situation where vibrations are imparted due to the movement of the player object PO in the virtual space may be other than the case where the player object PO moves by swimming. For example, vibrations corresponding to various movement situations in the virtual space such as the situations where the player object PO walks, runs, jumps, flies, slides, dives, floats, falls over, rotates, lands, and plunges, a vehicle moves, and the player object PO stops moving may be imparted to the user. Further, the staging vibration is generated not only in accordance with the fact that the player object PO moves in the virtual space, but also can be generated in accordance with another situation in the virtual space. For example, the staging vibration may be a vibration corresponding to various environments in the virtual space such as wind blowing the player object PO, and rain striking the player object PO, a noise and a sound around the player object PO, and contact with the player object PO in the virtual space, a vibration indicating a predetermined time or a predetermined timing in the virtual space, a vibration corresponding to BGM, and the like.

In the exemplary embodiment, to cause the user to preferentially perceive the above vibrations regarding the game element, when the player object PO is in a predetermined situation in the virtual space, the intensity of the staging vibration is weakened. For example, when it is determined that the player object PO is in the predetermined situation, vibration control is performed so that regarding the staging vibration, the vibration is weaker than in a case where it is not determined that the player object PO is in the predetermined situation, or the vibration disappears. In the exemplary embodiment, an adjustment coefficient for adjusting the intensity of the staging vibration is set to a numerical value between 0 and 1 inclusive, and a vibration waveform indicating the staging vibration is multiplied by the adjustment coefficient, whereby the amplitude of the vibration waveform indicating the staging vibration attenuates. Further, possible examples of the case where the player object PO is in the predetermined situation include, typically, a case where the player object PO is during a fight against the enemy object EO, a case where the player object PO is during a game against another object, and the like. It should be noted that in the exemplary embodiment, a criterion for determining whether or not the player object PO is during a fight against the enemy object EO varies depending on the game mode. Thus, with reference to FIGS. 13 to 15, a description is given of examples of a determination criterion and an adjustment coefficient to be set with respect to each game mode.

FIG. 13 is a diagram showing examples of the settings of an adjustment coefficient in a single play mode. In the single play mode, the actions of all enemy objects EO are automatically controlled by a CPU (e.g., the processor 81), and the player object PO operated by the user is operated only by the user of the game system 1.

In the single play mode, the determination of whether or not the player object PO is during a fight against the enemy objects EO is made based on the actions of the player object PO and/or the enemy objects EO in the virtual space. For example, immediately after a game is started in the single play mode, it is determined that the player object PO is not during a fight against the enemy objects EO. Then, the adjustment coefficient is set to 1.0. Consequently, immediately after the game is started in the single play mode, the staging vibration is imparted to the user with a normal intensity. Then, after the game is started in the single play mode, and when the player object PO is found by the enemy objects EO in the virtual space, it is determined that the player object PO is during a fight against the enemy objects EO. In this case, the adjustment coefficient is faded out (decreased in a gradually decreasing manner) from 1.0 to 0.0 in accordance with the elapsed time from when the player object PO is found. For example, the adjustment coefficient is faded out from 1.0 to 0.0 for 60 frames (e.g., for 1 second), which is a game processing unit, from when the player object PO is found. Further, after the game is started in the single play mode, and when the distance between the player object PO and any of the enemy objects EO comes close to a predetermined distance (e.g., 30 m) or less in the virtual space, it is determined that the player object PO is during a fight against the enemy objects EO. In this case, the adjustment coefficient is set in accordance with the distance between the player object PO and any of the enemy objects EO. For example, in accordance with the fact that the distance comes close to 10 m from 30 m, the adjustment coefficient is set to decrease from 1.0 to 0.0. It should be noted that when a decrease in the adjustment coefficient based on the elapsed time and a decrease in the adjustment coefficient based on the distance simultaneously occur, the smaller numerical value of the adjustment coefficient may be employed, or the larger numerical value of the adjustment coefficient may be employed, or the result of multiplying both numerical values may be employed as the adjustment coefficient.

Further, the adjustment coefficient may immediately change from 1.0 to 0.0. In this case, when the player object PO is found by the enemy objects EO in the virtual space, or when the distance between the player object PO and any of the enemy objects EO comes close to the predetermined distance, the adjustment coefficient immediately changes from 1.0 to 0.0. Further, the minimum value of the adjustment coefficient when decreased in a gradually decreasing manner or immediately changed may be a value greater than 0.0. The minimum value may be any value less than 1.0.

Further, in the game in the single play mode, when a fighting state between the player object PO and the enemy objects EO is dissolved, the adjustment coefficient may be changed back to 1.0. For example, in the example of FIG. 13, the enemy objects EO that are during a fight against the player object PO according to a determination disappears (typically, when the enemy objects EO are completely destroyed in the virtual space), it may be determined that the player object PO is not during a fight against the enemy objects EO. Then, the adjustment coefficient may be set to 1.0. In this case, the adjustment coefficient is faded in (increased in a gradually increasing manner) from 0.0 to 1.0 in accordance with the elapsed time from when the fighting state is dissolved. For example, the adjustment coefficient is faded in from 0.0 to 1.0 for 180 frames (e.g., 3 seconds), which is a game processing unit, from when the fighting state is dissolved. Consequently, when the player object PO is not during a fight in the game in the single play mode, the staging vibration is imparted to the user with the normal intensity.

FIG. 14 is a diagram showing examples of the settings of an adjustment coefficient in a competition play mode. In the competition play mode, at least one enemy object EO of which the action is controlled by an operation of a user of another game system 1 capable of communicating with the game system 1 is included.

In the competition play mode, the determination of whether or not the player object PO is during a fight against the enemy objects EO is made based on an elapsed time and the moving distance of the player object PO in the virtual space. For example, immediately after a game is started in the competition play mode, it is determined that the player object PO is not during a fight against the enemy objects EO. Then, the adjustment coefficient is set to 1.0. Consequently, immediately after the game is started in the competition play mode, the staging vibration is imparted to the user with a normal intensity. Then, after the game is started in the competition play mode, and when a predetermined time (e.g., 60 frames (1 second) elapse, it is determined that the player object PO is during a fight against the enemy objects EO. In this case, the adjustment coefficient is faded out (decreased in a gradually decreasing manner) from 1.0 to 0.0 in accordance with the elapsed time from when the predetermined time elapses. For example, the adjustment coefficient is faded out from 1.0 to 0.0 for 240 frames (e.g., 4 seconds), which is a game processing unit, from when the predetermined time elapses. Further, after the game is started in the competition play mode, and in accordance with the distance at which the player object PO moves from a game start position to an enemy's camp where the enemy objects EO are placed in the virtual space, it is determined that the player object PO is during a fight against the enemy objects EO. In this case, the adjustment coefficient is set in accordance with the moving distance at which the player object PO moves from the start position to the enemy's camp. For example, the adjustment coefficient is set to decrease from 1.0 to 0.0 in accordance with an increase in the moving distance from 0 m to 40 m. It should be noted that when a decrease in the adjustment coefficient based on the elapsed time and a decrease in the adjustment coefficient based on the moving distance simultaneously occur, the smaller numerical value of the adjustment coefficient may be employed, or the larger numerical value of the adjustment coefficient may be employed, or the result of multiplying both numerical values may be employed as the adjustment coefficient.

Further, in the game in the competition play mode, when a fighting state between the player object PO and the enemy objects EO is dissolved, the adjustment coefficient may be changed back to 1.0. For example, when the enemy objects EO are completely destroyed in the virtual space, it may be determined that the player object PO is not during a fight against the enemy objects EO. Then, the adjustment coefficient may be set to 1.0. In this case, the adjustment coefficient is faded in (increased in a gradually increasing manner) from 0.0 to 1.0 in accordance with the elapsed time from when the fighting state is dissolved. Consequently, when the player object PO is not during a fight in the game in the competition play mode, the staging vibration is imparted to the user with the normal intensity.

FIG. 15 is a diagram showing examples of the settings of an adjustment coefficient in a cooperation play mode. In the game in the cooperation play mode, the player object PO and another player object of which the action is controlled by an operation of a user of another game system 1 capable of communicating with the game system 1 cooperate to fight against enemy objects EO of which the actions are automatically controlled by a CPU (e.g., the processor 81).

In the cooperation play mode, the determination of whether or not the player object PO is during a fight against the enemy objects EO is made based on an event start timing and an elapsed time. For example, immediately after a game is started in the cooperation play mode, it is determined that the player object PO is not during a fight against the enemy objects EO. Then, the adjustment coefficient is set to 1.0. Consequently, immediately after the game is started in the cooperation play mode, the staging vibration is imparted to the user with a normal intensity. Then, after the game is started in the cooperation play mode, an event for causing the enemy objects EO to appear in the virtual space is performed. Then, when this event occurs, it is determined that the player object PO is during a fight against the enemy objects EO. In this case, the adjustment coefficient is faded out (decreased in a gradually decreasing manner) from 1.0 to 0.0 in accordance with the elapsed time from when the event occurs. For example, the adjustment coefficient is faded out from 1.0 to 0.0 for 300 frames (e.g., 5 seconds), which is a game processing unit, from when the event occurs. Further, when the event ends, it is determined that the player object PO is not during a fight against the enemy objects EO. In this case, the adjustment coefficient is faded in (increased in a gradually increasing manner) from 0.0 to 1.0 in accordance with the elapsed time from when the event ends. For example, the adjustment coefficient is faded in from 0.0 to 1.0 for 300 frames (e.g., 5 seconds), which is a game processing unit, from when the event ends. Consequently, when the player object PO is not during a fight in the game in the cooperation play mode, the staging vibration is imparted to the user with the normal intensity.

It should be noted that the adjustment coefficient may be linearly decreased or non-linearly decreased in accordance with the elapsed time or the distance. Further, the adjustment coefficient may immediately change from 1.0 to 0.0. In this case, when the player object PO is found by the enemy objects EO in the virtual space, or when the distance between the player object PO and any of the enemy objects EO comes close to the predetermined distance, the adjustment coefficient immediately changes from 1.0 to 0.0. Further, the minimum value of the adjustment coefficient when decreased in a gradually decreasing manner or immediately changed may be a value greater than 0.0. The minimum value may be any value less than 1.0.

As described above, the left controller 3 includes the vibrator 107, and the right controller 4 includes the vibrator 117. The processor 81 of the main body apparatus 2 transmits vibration data to the left controller 3 and/or the right controller 4 in accordance with the situation of the game that is being executed by the processor 81, and thereby can vibrate the vibrator 107 or the vibrator 117 at an amplitude and a frequency corresponding to the vibration data. Then, in accordance with a game mode or the situation of the player object PO, the processor 81 transmits vibration data adjusted to an appropriate vibration intensity to the left controller 3 and/or the right controller 4. In the exemplary embodiment, a vibration waveform (a vibration signal) is generated by associating a plurality of types of vibrations with a plurality of states of the player object PO, and vibration data indicating a vibration waveform corresponding to the state of the player object PO at the current moment is transmitted to the left controller 3 and/or the right controller 4. Here, when a plurality of vibrations are simultaneously generated, a vibration waveform indicating a waveform obtained by combining the vibration waveforms of these vibrations is generated. For example, examples of a method for generating vibration data for vibrating a controller by combining vibration waveforms include a selection method and an addition method.

Figure 16:
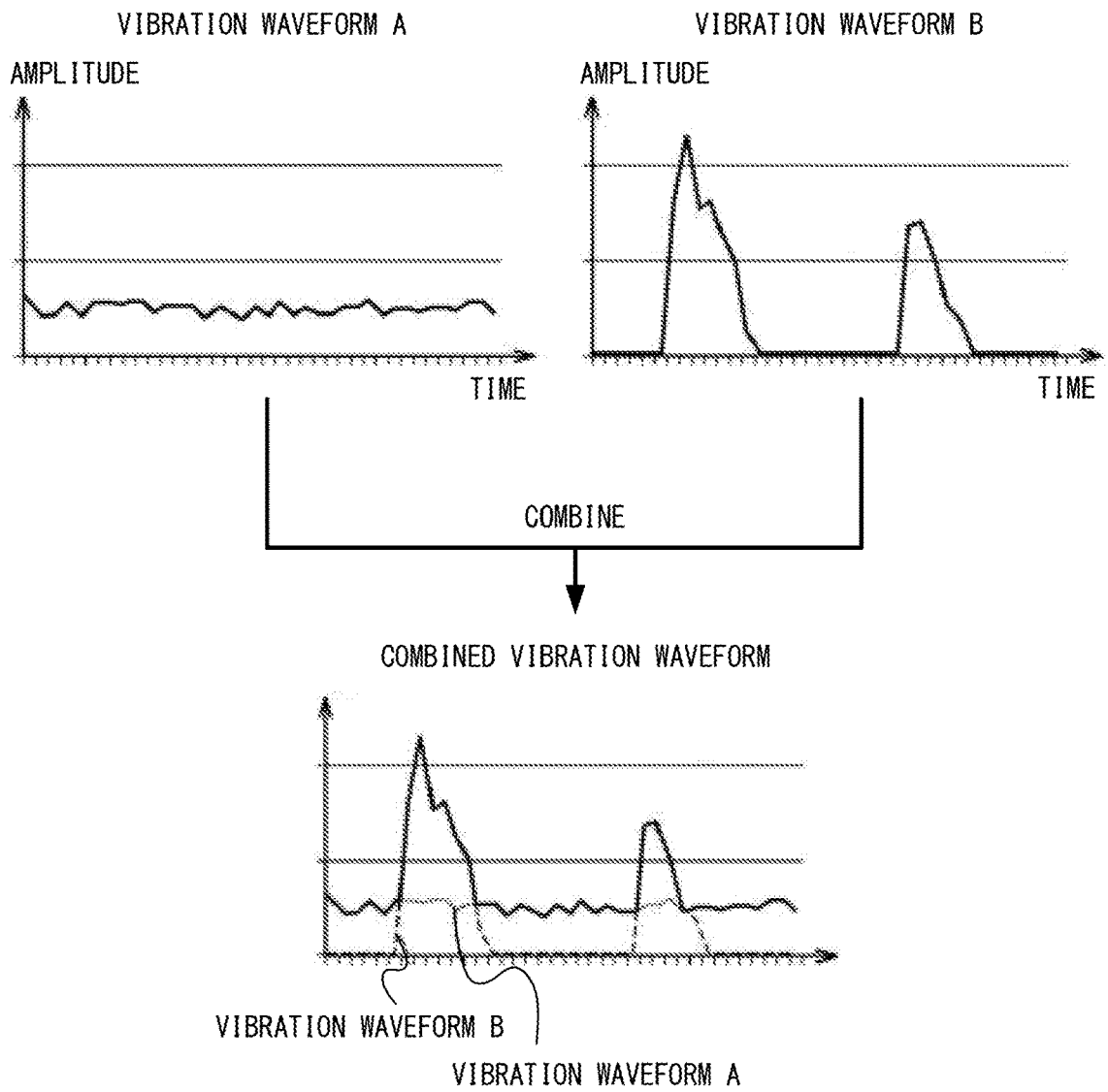
FIG. 16 is a diagram illustrating a non-limiting example of a method for generating vibration data by a selection method.
Figure 17:
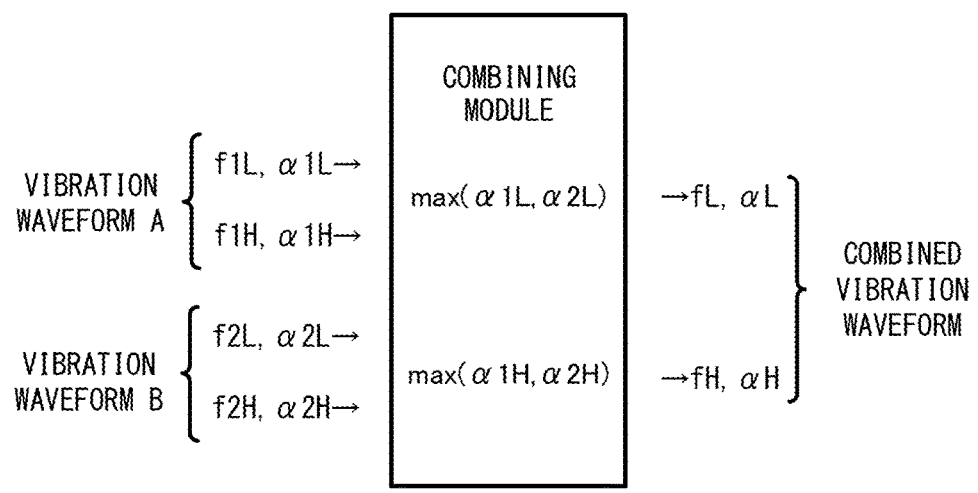
FIG. 17 is a diagram showing a non-limiting example of a combining module for use when a high-frequency side and a low-frequency side are collectively determined.

With reference to FIGS. 16 to 18, a description is given below of methods for generating vibration data by combining vibration waveforms. It should be noted that FIG. 16 is a diagram illustrating an example of a method for generating vibration data by the selection method. FIG. 17 is a diagram showing an example of a combining module for use when a high-frequency side and a low-frequency side are collectively determined. FIG. 18 is a diagram illustrating an example of a method for generating vibration data by the addition method.

In the following examples, cases are assumed where a vibration based on a vibration waveform A and a vibration based on a vibration waveform B are simultaneously generated. When the intensity of a vibration is adjusted for the staging vibration based on the above adjustment coefficient, a vibration waveform subjected to this adjustment is used for the staging vibration. For example, the intensity of the vibration is adjusted by multiplying the amplitude of the vibration waveform of the staging vibration to be adjusted by the adjustment coefficient. It should be noted that when the vibration waveform of the staging vibration to be adjusted is indicated by the combination of a vibration waveform of a high-frequency band and a vibration waveform of a low-frequency band, each of the amplitudes on the high-frequency side and the low-frequency side may be adjusted.

When vibration data is generated by the selection method, either one of vibration data indicating the vibration waveform A to be combined and vibration data indicating the vibration waveform B to be combined is selected every predetermined time. Specifically, when the vibration data of the vibration waveform A and the vibration data of the vibration waveform B are input, then based on the amplitude of the vibration waveform A and the amplitude of the vibration waveform B, vibration data indicating the vibration waveform having a greater amplitude is selected every predetermined time. Vibration data is thus selected by the selection method, whereby it is possible to preferentially generate a vibration that can be remarkably perceived by the user.

FIG. 16 shows an example of a case where the vibration waveform A and the vibration waveform B are input. The vibration waveform A indicates a relatively weak and continuous vibration, and the vibration waveform B indicates a relatively strong and short vibration. For example, when vibration data is generated by the selection method, it is determined which vibration waveform has a greater amplitude every predetermined period (e.g., 5 msec to several tens of msec), vibration data indicating the vibration waveform having a greater amplitude is selected and output. Thus, in the selection method, a combined vibration waveform is generated based on a vibration waveform selected every predetermined period, and vibration data indicating the combined vibration waveform is output.

It should be noted that when vibration data is selected by the selection method, vibration data to be selected may be determined also taking into account the frequency of a vibration waveform indicated by the vibration data. For example, when input vibration data is indicated by the combination of a vibration waveform of a high-frequency band and a vibration waveform of a low-frequency band, a method for independently determining each of the high-frequency side and the low-frequency side, and a method for determining the high-frequency side and the low-frequency side by weighting one of the high-frequency side and the low-frequency side are possible. In the first method, when the vibration waveform A and the vibration waveform B are input, then based on the amplitude of the vibration waveform A on the high-frequency side and the amplitude of the vibration waveform B on the high-frequency side, vibration data indicating a vibration waveform having a greater amplitude is selected as vibration data on the high-frequency side every predetermined time. Further, when the vibration waveform A and the vibration waveform B are input, then based on the amplitude of the vibration waveform A on the low-frequency side and the amplitude of the vibration waveform B on the low-frequency side, vibration data indicating a vibration waveform having a greater amplitude is selected as vibration data on the low-frequency side every predetermined time. In the second method, after the amplitude of each frequency band is weighted, a vibration waveform indicating the greatest amplitude is selected every predetermined period, and between the input vibration waveform A and the input vibration waveform B, vibration data indicating a vibration waveform including the selected vibration waveform is selected.

Further, when input vibration data is indicated by the combination of a vibration waveform of a high-frequency band and a vibration waveform of a low-frequency band, it is possible to collectively determine the high-frequency side and the low-frequency side. In FIG. 17, the above combining module compares an amplitude obtained by combining an amplitude $\alpha 1L$ on the low-frequency side and an amplitude $\alpha 1H$ on the high-frequency side of the vibration waveform A, with an amplitude obtained by combining an amplitude $\alpha 1L$ on the low-frequency side and an amplitude $\alpha 1H$ on the high-frequency side of the vibration waveform B (i.e., a function max ($\alpha 1L+\alpha 1H$, $\alpha 1L+\alpha 1H$)), and outputs as a combined vibration waveform a vibration waveform indicating a greater amplitude in the comparison. That is, based on a value ($\alpha 1L+\alpha 1H$) calculated from a first amplitude ($\alpha 1L$) and a second amplitude ($\alpha 1H$) included in the vibration waveform A, and a value ($\alpha 1L+\alpha 1H$) calculated from a first amplitude ($\alpha 1L$) and a second amplitude ($\alpha 1H$) included in the vibration waveform B, the combining module selectively outputs either of the vibration waveforms.

As described above, when the vibration data of the vibration waveform of the high-frequency band and the vibration waveform of the low-frequency band of the vibration waveform A and the vibration data of the vibration waveform of the high-frequency band and the vibration waveform of the low-frequency band of the vibration waveform B are input, then based on the total of the amplitudes indicated by the vibration data of the vibration waveform A and the total of the amplitudes indicated by the vibration data of the vibration waveform B, a plurality of vibration data having a larger total of the amplitudes are selected every predetermined period. Thus, between the vibration waveform A and the vibration waveform B, a greater amplitude is selected as a whole. Thus, it is possible to impart vibration stimulus to the user while maintaining the characteristics of the entirety of input vibration waveforms.

Further, in the selection method shown in FIG. 17, evaluation may be made by weighting the amplitude of an input vibration pattern based on the frequency. Generally, a human being is sensitive to a vibration on the low-frequency side. Thus, for example, the amplitude on the low-frequency side may be multiplied by a weighting coefficient (e.g., b>1) greater than the amplitude on the high-frequency side. In this case, using a function max ($bX\alpha 1L+\alpha 1H$, $bX\alpha 1L+\alpha 1H$), it may be determined which amplitude is greater.

Further, the configuration may be such that without regard to the difference between a frequency f1L on the low-frequency side of the vibration waveform A and a frequency f2L on the low-frequency side of the vibration waveform B, and the difference between a frequency f1H on the high-frequency side of the vibration waveform A and a frequency f2H on the high-frequency side of the vibration waveform B, only the amplitudes of the vibration waveforms may be compared.

Further, a predetermined number of frequency components may be selected, based on the magnitudes of the amplitudes, from frequency components included in the vibration waveform A and the vibration waveform B. That is, the top two frequency components may be extracted from the amplitude $\alpha 1L$ on the low-frequency side of the vibration waveform A, the amplitude a1H on the high-frequency side of the vibration waveform A, the amplitude α1L on the low-frequency side of the vibration waveform B, and the amplitude α1H on the high-frequency side of the vibration waveform B, and output as a combined vibration waveform.

Further, when vibration data is selected by the selection method, vibration data to be selected may be determined based on a parameter different from the amplitude of a vibration waveform indicated by the vibration data. For example, based on the frequency of a vibration waveform indicated by vibration data, vibration data indicating the vibration waveform having a smaller frequency may be selected every predetermined time.

As shown in FIG. 18, when vibration data is generated by the addition method, regarding vibration data of the vibration waveform A and vibration data of the vibration waveform B, vibration waveforms are superimposed on each other every predetermined time. Specifically, when the vibration data of the vibration waveform A and the vibration data of the vibration waveform B are input, a combined vibration waveform is generated by superimposing the vibration waveform A and the vibration waveform B on each other every predetermined time, and vibration data indicating the combined vibration waveform is generated. Specifically, it is possible to generate a combined vibration waveform by adding the amplitudes of vibration waveforms input every predetermined cycle. In this case, the vibration waveform A and the vibration waveform B are coupled together on a time axis. Vibration data is thus generated by the addition method, whereby, for example, in the situation where a plurality of vibrations of similar types can frequently overlap each other as shown in FIG. 18, it is possible to cause the user to perceive vibrations overlapping each other without lacking the plurality of vibrations of similar types.

Here, when vibration data is combined by the addition method, the frequency of a combined vibration waveform is calculated based on the frequency of the vibration waveform A and the frequency of the vibration waveform B. As a first example, between the input vibration waveform A and the input vibration waveform B, the frequency of a vibration waveform having the greatest amplitude is adopted. As a second example, the average value of the frequency of the input vibration waveform A and the frequency of the input vibration waveform B is adopted. As a third example, after the frequency of the input vibration waveform A and the frequency of the input vibration waveform B are weighted based on the respective amplitudes (e.g., a weighted average corresponding to the amplitude), the frequency is calculated based on the first example or the second example.

It should be noted that when vibration data is combined by the addition method, it is possible to generate a combined vibration waveform by adding the amplitudes of vibration waveforms input every predetermined cycle. Alternatively, a combined vibration waveform may be generated by averaging the amplitudes of vibration waveforms. Further, when a combined vibration waveform is generated by averaging the amplitudes of vibration waveforms, the amplitudes weighted based on the frequencies of the respective vibration waveforms may be averaged.

As described above, when a plurality of vibrations are simultaneously generated, a vibration is generated based on a single combined vibration waveform that is generated. Thus, the user operating the game system 1 can perceive a plurality of vibrations. Even when a plurality of vibrations are simultaneously generated, it is possible to prevent interest from being impaired.

Figure 19:
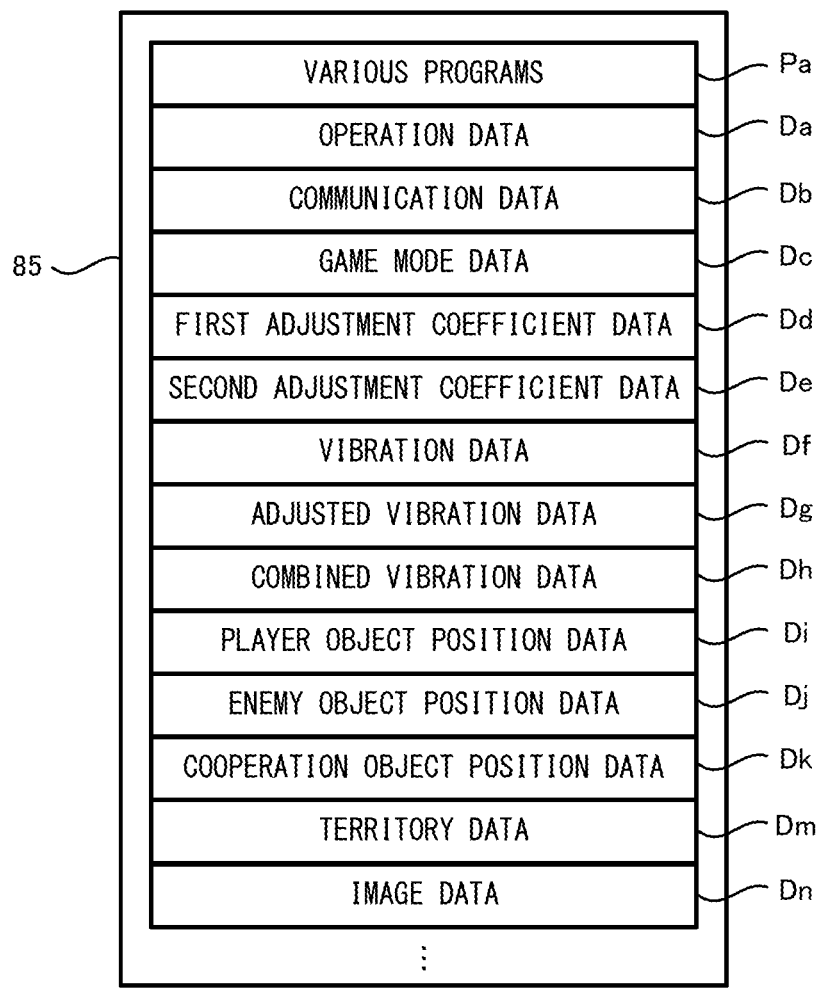
FIG. 19 is a diagram showing a non-limiting example of a data area set in a DRAM 85 of the main body apparatus 2 in the exemplary embodiment.

Next, with reference to FIGS. 19 to 24, a description is given of an example of specific processing executed by the game system 1 according to the exemplary embodiment. FIG. 19 is a diagram showing an example of a data area set in the DRAM 85 of the main body apparatus 2 according to the exemplary embodiment. It should be noted that in the DRAM 85, in addition to data shown in FIG. 19, data used for other processes is also stored, but is not described in detail here.

In a program storage area of the DRAM 85, various programs Pa, which are executed by the game system 1, are stored. In the exemplary embodiment, as the various programs Pa, a communication program for communicating with another game system, an application program for performing information processing (e.g., game processing) based on data acquired from the left controller 3 and/or the right controller 4, a vibration control program for vibrating the left controller 3 and/or the right controller 4, and the like are stored. It should be noted that the various programs Pa may be stored in advance in the flash memory 84, or may be acquired from a storage medium attachable to and detachable from the game system 1 (e.g., a storage medium attached to the slot 23) and stored in the DRAM 85, or may be acquired from another apparatus via a network such as the Internet and stored in the DRAM 85. The processor 81 executes the various programs Pa stored in the DRAM 85.

In a data storage area of the DRAM 85, various data used for processes such as a communication process, information processing, and the like executed by the game system 1 is stored. In the exemplary embodiment, in the DRAM 85, operation data Da, communication data Db, game mode data Dc, first adjustment coefficient data Dd, second adjustment coefficient data De, vibration data Df, adjusted vibration data Dg, combined vibration data Dh, player object position data Di, enemy object position data Dj, cooperation object position data Dk, territory data Dm, image data Dn, and the like are stored.

The operation data Da is operation data appropriately acquired from each of the left controller 3 and/or the right controller 4. As described above, operation data acquired from each of the left controller 3 and/or the right controller 4 includes information regarding an input (specifically, information regarding an operation or the detection result of each sensor) from each input section (specifically, each button, an analog stick, and each sensor). In the exemplary embodiment, operation data is acquired from each of the left controller 3 and/or the right controller 4 attached to the main body apparatus 2 in a predetermined cycle through wireless communication, and the operation data Da is appropriately updated using the acquired operation data. It should be noted that the update cycle of the operation data Dc may be such that the operation data Da is updated every frame, which is the cycle of the processing described later performed by the game system 1, or is updated every cycle in which operation data is acquired.

The communication data Db is data received from another game system through wireless communication and includes operation data of an operation of another user performed using the other game system, and data regarding the position and the action of another player object controlled by the other game system and the like.

The game mode data Dc is data indicating a game mode (e.g., the single play game mode, the competition play game mode, or the cooperation play game mode) selected and set by the user.

The first adjustment coefficient data Dd is data indicating a first adjustment coefficient for adjusting the intensity of the staging vibration. The second adjustment coefficient data De is data indicating a second adjustment coefficient for adjusting the intensity of the staging vibration.

The vibration data Df is data indicating a vibration for vibrating each of the left controller 3 and the right controller 4. The adjustment vibration data Dg is data indicating a vibration of which the amplitude is adjusted to vibrate each of the left controller 3 and/or the right controller 4. The combined vibration data Dh is vibration data indicating a vibration waveform obtained by combining a plurality of vibrations.

The player object position data Di is data indicating the position and the direction (the moving direction) in the virtual space of the player object PO or another player object operated by another user in cooperation play. The enemy object position data Dj is data indicating the position and the direction in the virtual space of an enemy object EO. The cooperation object position data Dk is data indicating the position and the direction (the moving direction) in the virtual space of the other player object (a cooperation object) that appears in the cooperation play game mode. It should be noted that the player object position data Di, the enemy object position data Dj, and the cooperation object position data Dk include data indicating the position and the direction (the moving direction) in the virtual space of a weapon (a bullet or the like) fired by each of the player object and the enemy object.

The territory data Dm is data indicating each of the positions of an "ally area", an "enemy area", and a "neutral area" set in the virtual space.

The image data Dn is data for displaying an image (e.g., an image of a virtual object, a field image, or a background image) on the display 12 of the main body apparatus 2 when a game is performed.

Figure 21:
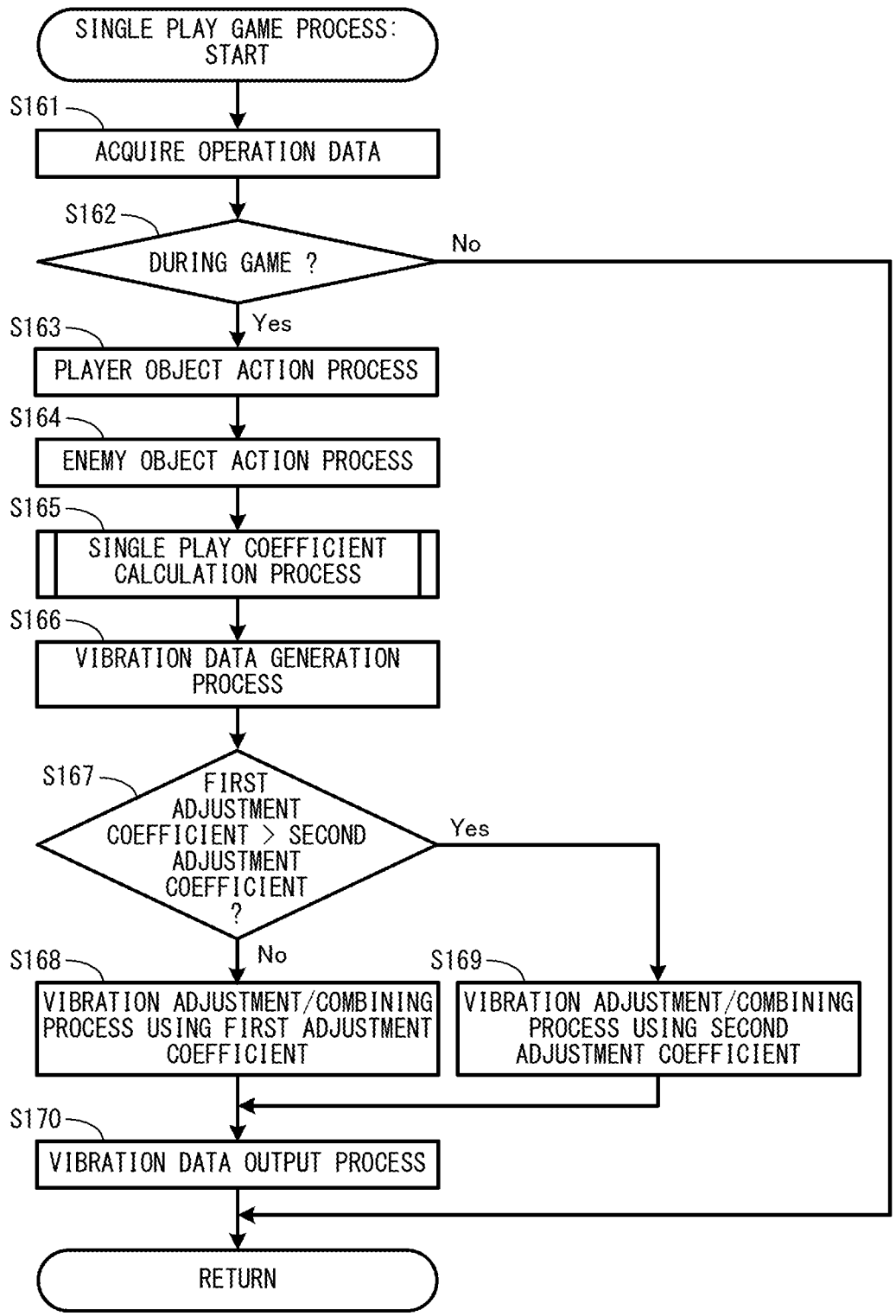
FIG. 21 is a subroutine showing non-limiting examples of the details of a single play game process performed in step S146 in FIG. 20.
Figure 22:
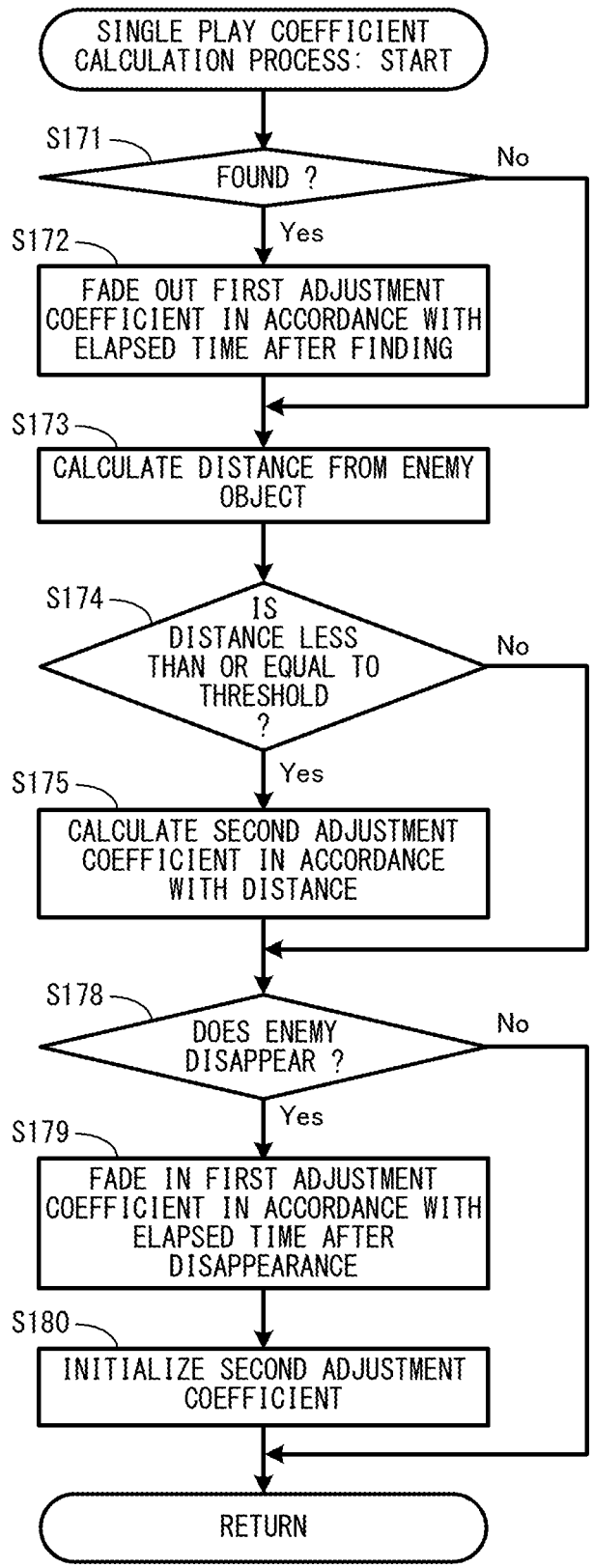
FIG. 22 is a subroutine showing non-limiting examples of the details of a single play coefficient calculation process performed in step S165 in FIG. 21.
Figure 23:
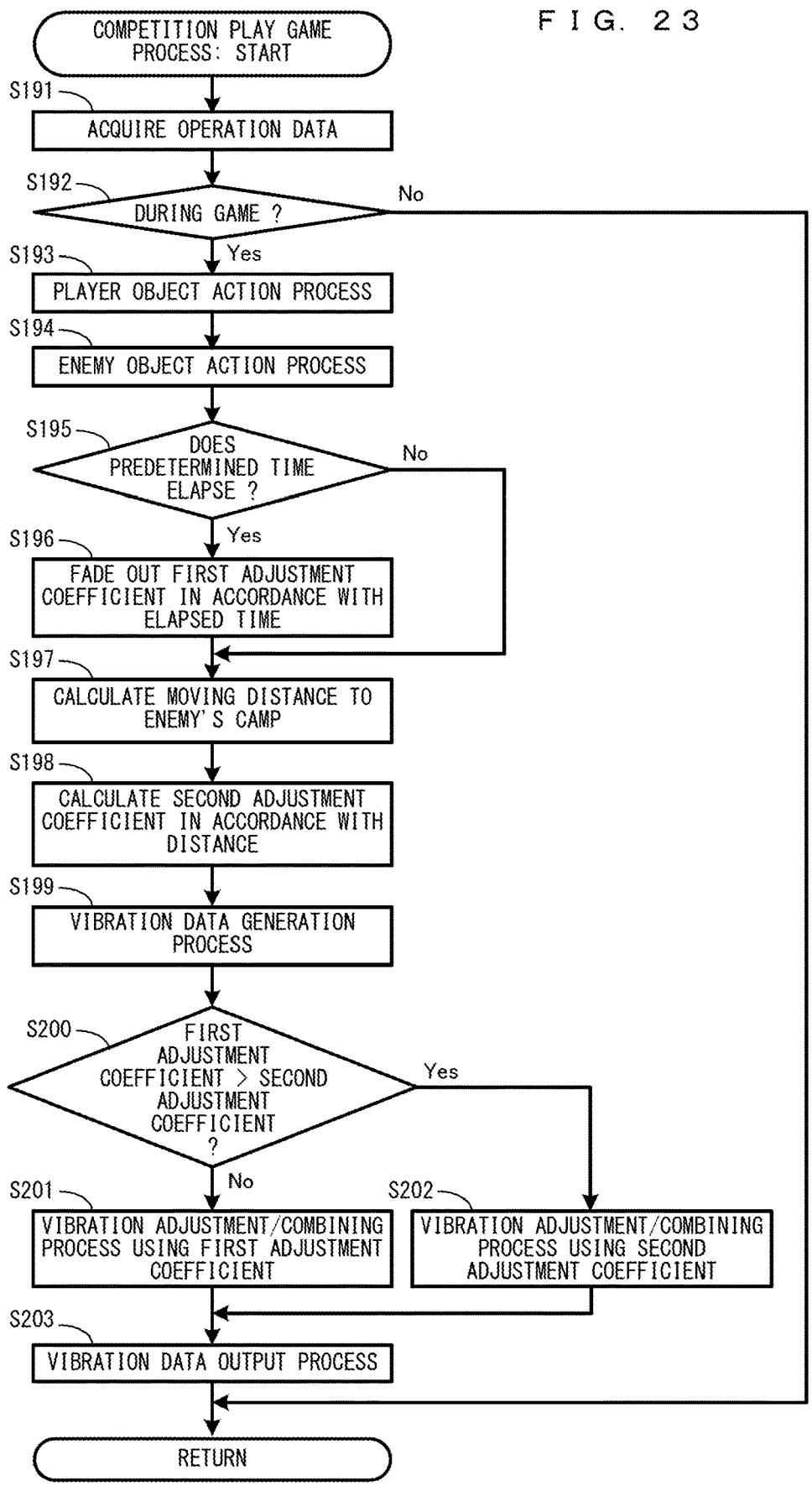
FIG. 23 is a subroutine showing non-limiting examples of the details of a competition play game process performed in step S149 in FIG. 20.
Figure 24:
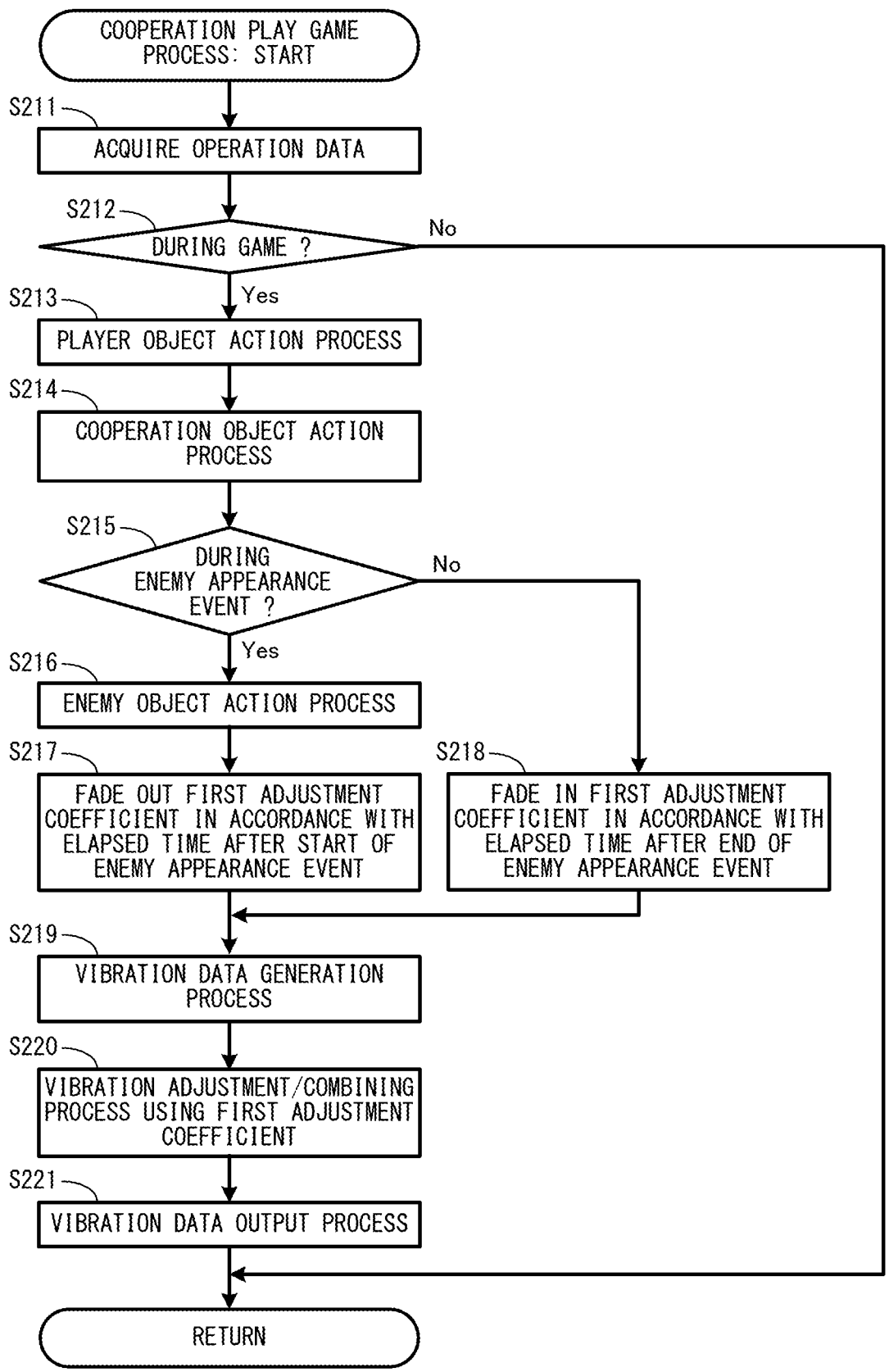
FIG. 24 is a subroutine showing non-limiting examples of the details of a cooperation play game process performed in step S150 in FIG. 20.

Next, with reference to FIGS. 20 to 24, a detailed example of game processing according to the exemplary embodiment is described. FIG. 20 is a flow chart showing an example of game processing executed by the game system 1. FIG. 21 is a subroutine showing examples of the details of a single play game process performed in step S146 in FIG. 20. FIG. 22 is a subroutine showing examples of the details of a single play coefficient calculation process performed in step S165 in FIG. 21. FIG. 23 is a subroutine showing examples of the details of a competition play game process performed in step S149 in FIG. 20. FIG. 24 is a subroutine showing examples of the details of a cooperation play game process performed in step S150 in FIG. 20. In the exemplary embodiment, a series of processes shown in FIGS. 20 to 24 is performed by the processor 81 executing the communication program and a predetermined application program (a game program) included in the various programs Pa. Further, the game processing shown in FIGS. 20 to 24 is started at any timing.

It should be noted that the processes of all of the steps in the flow charts shown in FIGS. 20 to 24 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 20 to 24 may be executed by the cooperation of a plurality of information processing apparatuses including the main body apparatus 2.

In FIG. 20, the processor 81 acquires operation data from the left controller 3 and/or the right controller 4 and updates the operation data Da (step S141), and the processing proceeds to the next step.

Next, the processor 81 determines whether or not a game mode is selected by the user (step S142). Then, when a game mode is selected, the processing proceeds to step S143. On the other hand, when a game mode is not selected, the process of step S141 is repeated, and the processor 81 waits for the user to select a game mode. As an example, the processor 81 displays options urging the user to select a game mode on the display 12 of the main body apparatus 2. Then, when the operation data acquired in the above step S141 indicates the operation of selecting any of the options, the processor 81 determines that a game mode is selected. For example, the processor 81 displays options for selecting the single play game mode, the competition play game mode, and the cooperation play game mode on the display 12 of the main body apparatus 2, thereby urging the user to select any of the options.

In step S143, the processor 81 sets the game mode, and the processing proceeds to the next step. For example, the processor 81 updates the game mode data Dc using data indicating the game mode selected in the above step S142. It should be noted that when the competition play game mode or the cooperation play game mode is set, the processor 81 receives data regarding the game (e.g., data indicating the type, the initial position, and the like of a player object operated by another user) from a game system operated by another user participating in the game and updates the communication data Db.

Next, the processor 81 performs initialization in game processing in accordance with the selected game mode (step S144), and the processing proceeds to the next step. For example, in the initialization, the processor 81 initializes a parameter for performing the process described below. For example, the processor 81 sets each of the first adjustment coefficient and the second adjustment coefficient to 1.0, thereby updating the first adjustment coefficient data Dd and the second adjustment coefficient data De. Further, in the initialization, the processor 81 sets as a "neutral area" the entirety of a game field where game play is performed in accordance with the game mode, and sets the initial position of the player object PO on the game field, thereby updating each of the player object position data Di and the territory data Dm. Further, when the single play game mode is selected, the processor 81 sets the initial positions of enemy objects EO on the game field, thereby updating the enemy object position data Dj. Further, when the competition play game mode is selected, then with reference to the communication data Db and based on the data received from the game system operated by the other user participating in the game, the processor 81 sets the initial positions of enemy objects EO on the game field, thereby updating the enemy object position data Dj. Further, when the cooperation play game mode is selected, then with reference to the communication data Db and based on the data received from the game system operated by the other user participating in the game, the processor 81 sets the initial position of another player object (a cooperation object) on the game field, thereby updating the cooperation object position data Dk.

Next, the processor 81 determines whether or not the single play game mode is selected (step S145). Then, when the single play game mode is selected, the processing proceeds to step S146. On the other hand, when the single play game mode is not selected, the processing proceeds to step S147.

In step S146, the processor 81 performs game processing in the single play game mode, and the processing proceeds to step S151. With reference to FIG. 21, the game processing in the single play game mode is described below.

In FIG. 21, the processor 81 acquires operation data from the left controller 3 and the right controller 4 and updates the operation data Da (step S161), and the processing proceeds to the next step.

Next, the processor 81 determines whether or not the current moment is during a game (step S162). Then, when the current moment is during a game, including a time immediately after the game is started, the processing proceeds to step S163. On the other hand, when the current moment is not during a game, the processing of this subroutine ends.

In step S163, the processor 81 performs a player object action process, and the processing proceeds to the next step. For example, based on the operation data acquired in the above step S161, the processor 81 sets the content of an instruction regarding the player object PO, and in accordance with the content of the instruction, causes the player object PO to perform an action, thereby updating the player object position data Di. It should be noted that when the player object PO performs the action of increasing an "ally area", then based on the action, the processor 81 enlarges the "ally area", thereby updating the territory data Dm.

Next, the processor 81 performs an enemy object action process (step S164), and the processing proceeds to the next step. For example, based on a predetermined algorithm, the processor 81 automatically controls the enemy objects EO to perform actions, thereby updating the enemy object position data Dj. It should be noted that when any of the enemy objects EO performs the action of increasing an "enemy area", then based on the action, the processor 81 enlarges the "enemy area", thereby updating the territory data Dm.

Next, the processor 81 performs a single play coefficient calculation process (step S165), and the processing proceeds to step S166. With reference to FIG. 22, the single play coefficient calculation process is described below.

In FIG. 22, the processor 81 determines whether or not the enemy objects EO find the player object PO on the game field (step S171). For example, when the player object PO enters the range of field of view set for each enemy object EO, and at least a part of the player object PO is watched by the enemy object EO, or when a trace indicating the presence of the player object PO within the range of field of view is watched by the enemy object EO, the processor 81 determines that the player object PO is found by the enemy objects EO. Then, when the player object PO is found by the enemy objects EO, the processing proceeds to step S172. On the other hand, when the player object PO is not found by the enemy objects EO, the processing proceeds to step S173.

Here, in the determination process in the above step S171, it is determined whether or not the player object PO is found by the enemy objects EO. Consequently, the enemy objects EO find the player object PO and thereby can attack the player object PO. Then, the enemy objects EO can start preparation for attacking the player object PO. That is, the enemy objects EO find the player object PO, whereby the processor 81 controlling the actions of the enemy objects EO starts the process of attacking the player object PO. In the determination process in the above step S171, based on whether or not this process is performed, it is determined whether or not the player object PO is during a fight.

In step S172, in accordance with the elapsed time after the player object PO is found, the processor 81 performs the process of fading out the first adjustment coefficient from 1.0 to 0.0, and the processing proceeds to step S173. For example, using the first adjustment coefficient indicated by the first adjustment coefficient data Dd, the processor 81 changes the first adjustment coefficient so as to fade out from 1.0 to 0.0 for 60 frames (e.g., 1 second), which is a game processing unit, from when the player object PO is found. Then, the processor 81 updates the first adjustment coefficient data Dd using the changed first adjustment coefficient.

In step S173, the processor 81 calculates the distance between the player object PO and each of the enemy objects EO on the game field, and the processing proceeds to the next step. For example, with reference to the player object position data Di and the enemy object position data Dj, the processor 81 calculates the distance between the player object PO and each of the enemy objects EO on the game field.

Next, the processor 81 determines whether or not the distance calculated in the above step S173 is less than or equal to a predetermined threshold (step S174). For example, when the distance between the player object PO and the enemy object EO is less than or equal to a predetermined distance (e.g., 30 m) on the game field, the determination is affirmative in the above step S174. Then, when the distance is less than or equal to the predetermined threshold, the processing proceeds to step S175. On the other hand, when the distance is greater than the predetermined threshold, the processing proceeds to step S178. In the determination process in the above step S174, based on whether or not the distance between the player object PO and the enemy object EO is less than or equal to the predetermined distance, it is determined whether or not the player object PO is during a fight.

In step S175, in accordance with the distance between the player object PO and the enemy object EO, the processor 81 performs the process of calculating the second adjustment coefficient, and the processing proceeds to step S178. For example, with reference to the second adjustment coefficient data De, the processor 81 calculates the second adjustment coefficient so as to decrease from 1.0 to 0.0 in accordance with the fact that the distance comes close to 10 m from 30 m. Then, the processor 81 updates the second adjustment coefficient data De using the calculated second adjustment coefficient.

In step S178, the processor 81 determines whether or not the enemy objects EO that are during a fight against the player object PO according to a determination disappear. For example, when the enemy objects EO that are during a fight against the player object PO according to a determination are defeated (typically, when the enemy objects EO on the game field are completely destroyed), the determination is affirmative in the above step S178. Then, when the enemy objects EO that are during a fight against the player object PO according to a determination disappear, the processing proceeds to step S179. On the other hand, when the enemy objects EO that are during a fight against the player object PO according to a determination remain, or when it is not determined that the player object PO is during a fight, the processing of this subroutine ends.

In step S179, in accordance with the elapsed time after the enemy objects EO disappear, the processor 81 performs the process of fading in the first adjustment coefficient from 0.0 to 1.0, and the processing proceeds to the next step. For example, using the first adjustment coefficient indicated by the first adjustment coefficient data Dd, the processor 81 changes the first adjustment coefficient so as to fade in from 0.0 to 1.0 for 180 frames (e.g., 3 seconds), which is a game processing unit, from when the enemy objects EO disappear. Then, the processor 81 updates the first adjustment coefficient data Dd using the changed first adjustment coefficient.

Next, the processor 81 initializes the second adjustment coefficient to 1.0 (step S180), and the processing of this subroutine ends. For example, the processor 81 updates a value indicated by the second adjustment coefficient data De to 1.0.

Referring back to FIG. 21, after the single play coefficient calculation process in the above step S165, the processor 81 performs the process of generating vibration data for vibrating each of the left controller 3 and the right controller 4 (step S166), and the processing proceeds to the next step. For example, the processor 81 generates a vibration waveform corresponding to the state of the player object PO in the virtual space and generates vibration data based on the vibration waveform, thereby updating the vibration data Df. As an example, as described above, in the processor 81, a plurality of types of vibrations are associated with a plurality of states of the player object PO in the game field. The processor 81 selects a type of a vibration corresponding to the state of the player object PO at the current moment. Here, a plurality of vibrations are set depending on the state of the player object PO. In this case, the processor 81 updates the vibration data Df using vibration data of a vibration waveform indicating each vibration.

Next, the processor 81 determines whether or not the first adjustment coefficient is greater than the second adjustment coefficient (step S167). For example, with reference to the first adjustment coefficient data Dd and the second adjustment coefficient data De, the processor 81 compares the value of the first adjustment coefficient with the value of the second adjustment coefficient. Then, when the first adjustment coefficient is less than or equal to the second adjustment coefficient, the processing proceeds to step S168. On the other hand, when the first adjustment coefficient is greater than the second adjustment coefficient, the processing proceeds to step S169.

In step S168, using the first adjustment coefficient, the processor 81 performs an amplitude adjustment process on a staging vibration and performs the process of combining vibration waveforms, and the processing proceeds to step S170.

For example, based on the game mode (here, the single play game mode) indicated by the game mode data Dc, the processor 81 adjusts the amplitude of vibration data belonging to the staging vibration in the vibration data generated in the above step S166. As an example, the processor 81 multiplies an amplitude value indicated by the vibration waveform of the staging vibration indicated by the vibration data Df, by the first adjustment coefficient indicated by the first adjustment coefficient data Dd, thereby calculating the adjusted amplitude value. Then, the processor 81 adjusts the vibration waveform of the staging vibration using the adjusted amplitude value, thereby updating the adjustment vibration data Dg. Further, when the vibration waveform is adjusted, the processor 81 deletes the adjusted vibration data from the vibration data Df. It should be noted that when the first adjustment coefficient indicated by the first adjustment coefficient data Dd is 1.0, the amplitude adjustment process may not be performed. Further, when the first adjustment coefficient indicated by the first adjustment coefficient data Dd is 0.0, the amplitude adjustment process may not be performed, and the process of merely deleting the vibration data belonging to the staging vibration from the vibration data Df may be executed.

Further, using vibration data that is not a target of the amplitude adjustment process (i.e., a type of vibration data different from that of the staging vibration, e.g., vibration data regarding a game element) and the vibration data subjected to the amplitude adjustment process (i.e., the vibration data of the staging vibration), the processor 81 performs the process of combining vibration waveforms. For example, based on the vibration data Df generated in the above step S166 and the adjustment vibration data Dg adjusted in the amplitude adjustment process, the processor 81 generates combined vibration data for vibrating the left controller 3 and/or the right controller 4 and updates the combined vibration data Dh using the generated combined vibration data. Specifically, by the above selection method, addition method, or the like, the processor 81 combines the vibration waveforms indicated by the vibration data Df together and the vibration waveforms indicated by the adjustment vibration data Dg together and updates the combined vibration data Dh using the combined vibration waveforms. It should be noted that in the combined vibration data Dh, vibration data for the left controller 3 and vibration data for the right controller 4 may be separately stored. In this case, also in the process of combining vibration waveforms, the process of generating the vibration data for the left controller 3 and the process of generating the vibration data for the right controller 4 may be separately executed.

On the other hand, in step S169, using the second adjustment coefficient, the processor 81 performs an amplitude adjustment process on the staging vibration and performs the process of combining vibration waveforms, and the processing proceeds to step S170. It should be noted that the amplitude adjustment process and the process of combining vibration waveforms in the above step S169 are similar to those in step S168 except that the second adjustment coefficient is used instead of the first adjustment coefficient, and therefore are not described in detail here.

In step S170, the processor 81 performs the process of, in each cycle of transmitting vibration data, outputting vibration data corresponding to this cycle to the left controller 3 and the right controller 4, and the processing of this subroutine ends. For example, with reference to the combined vibration data Dh, the processor 81 transmits vibration data for a vibration length corresponding to the transmission cycle to the left controller 3 and the right controller 4. It should be noted that when the vibration data for the left controller 3 and the vibration data for the right controller 4 are separately stored in the combined vibration data Dh, the processor 81 outputs vibration data for the left controller 3 for a vibration length corresponding to the transmission cycle to the left controller 3 and outputs vibration data for the right controller 4 for a vibration length corresponding to the transmission cycle to the right controller 4. The vibration data is thus output to each controller, whereby each of the left controller 3 and the right controller 4 acquiring the vibration data vibrates based on vibration waveforms corresponding to the vibration data.

Referring back to FIG. 20, when it is determined in the above step S145 that the single play game mode is not selected, the processor 81 performs a communication process (step S147), and the processing proceeds to the next step. For example, the processor 81 performs the process of receiving data from the game system operated by the other user participating in the game and updates the communication data Db using the received data.

Next, the processor 81 determines whether or not the competition play game mode is selected (step S148). Then, when the competition play game mode is selected, the processing proceeds to step S149. On the other hand, when the competition play game mode is not selected, the processing proceeds to step S150.

In step S149, the processor 81 performs game processing in the competition play game mode, and the processing proceeds to step S151. With reference to FIG. 23, the game processing in the competition play game mode is described below.

In FIG. 23, the processor 81 acquires operation data from the left controller 3 and the right controller 4 and updates the operation data Da (step S191), and the processing proceeds to the next step.

Next, the processor 81 determines whether or not the current moment is during a game (step S192). Then, when the current moment is during a game, including a time immediately after the game is started, the processing proceeds to step S193. On the other hand, when the current moment is not during a game, the processing of this subroutine ends.

In step S193, the processor 81 performs a player object action process, and the processing proceeds to the next step. For example, based on the operation data acquired in the above step S191, the processor 81 sets the content of an instruction regarding the player object PO, and in accordance with the content of the instruction, causes the player object PO to perform an action, thereby updating the player object position data Di. It should be noted that when the player object PO performs the action of increasing an "ally area", then based on the action, the processor 81 enlarges the "ally area", thereby updating the territory data Dm.

Next, the processor 81 performs an enemy object action process (step S164), and the processing proceeds to the next step. For example, with reference to the communication data Db, the processor 81 acquires data transmitted from the game system operated by the other user participating in the game, and based on the transmitted data, causes an enemy object EO operated by the other user to perform an action, thereby updating the enemy object position data Dj. It should be noted that when the enemy object EO performs the action of increasing an "enemy area", then based on the action, the processor 81 enlarges the "enemy area", thereby updating the territory data Dm.

Next, the processor 81 determines whether or not a predetermined time elapses from the start of the game (step S195). For example, when 60 frames (1 second) elapse from the start of the game, the processor 81 determines that the predetermined time elapses from the start of the game. Then, when the predetermined time elapses from the start of the game, the processing proceeds to step S196. On the other hand, when the predetermined time does not elapse from the start of the game, the processing proceeds to step S197.

Here, in the determination process in the above step S195, it is determined whether or not a predetermined time elapses from when the game where the player object PO competes against the enemy object EO operated by the other user is started. This assumes that even in the state where the player object PO and the enemy object EO are placed too distant from each other on the game field to compete against each other at the start of the game, the predetermined time elapses after the game is started, whereby the player object PO and the enemy object EO can enter the state where the player object PO and the enemy object EO can fight against each other. In the determination process in the above step S195, based on whether or not the predetermined time elapses, it is determined whether or not the player object PO is during a fight.

In step S196, in accordance with the elapsed time after the game is started, the processor 81 performs the process of fading out the first adjustment coefficient from 1.0 to 0.0, and the processing proceeds to step S197. For example, using the first adjustment coefficient indicated by the first adjustment coefficient data Dd, the processor 81 changes the first adjustment coefficient so as to fade out (decrease in a gradually decreasing manner) from 1.0 to 0.0 in accordance with the elapsed time from when the predetermined time elapses. Then, the processor 81 updates the first adjustment coefficient data Dd using the changed first adjustment coefficient. As an example, the processor 81 changes the first adjustment coefficient so as to fade out from 1.0 to 0.0 for 240 frames (e.g., 4 seconds) from when the predetermined time elapses.

In step S197, the processor 81 calculates the distance at which the player object PO moves to the enemy's camp, and the processing proceeds to the next step. For example, the processor 81 calculates the distance at which, on the game field, the player object PO moves from a placement position at the start of the game to the enemy's camp where the enemy object EO is placed, and the processing proceeds to the next step.

Next, in accordance with the moving distance calculated in the above step S197, the processor 81 performs the process of calculating the second adjustment coefficient (step S198), and the processing proceeds to the next step. For example, with reference to the second adjustment coefficient data De, the processor 81 calculates the second adjustment coefficient so as to decrease from 1.0 to 0.0 in accordance with the fact that the moving distance increases from 0 m to 40 m. Then, the processor 81 updates the second adjustment coefficient data De using the calculated second adjustment coefficient. It should be noted that in the processes of the above steps S197 and S198, the second adjustment coefficient is set in accordance with the moving distance at which the player object PO comes close to the enemy's camp of the enemy object EO. This assumes that even in the state where the player object PO and the enemy object EO are placed too distant from each other on the game field to compete against each other at the start of the game, the player object PO comes close to the enemy's camp of the enemy object EO, whereby the player object PO and the enemy object EO can enter the state where the player object PO and the enemy object EO can fight against each other. In the processes of the above steps S197 and S198, the second adjustment coefficient is set using the fact that the longer the moving distance of the player object PO, the more likely the player object PO is during a fight.

Next, the processor 81 performs the process of generating vibration data for vibrating each of the left controller 3 and the right controller 4 (step S199), and the processing proceeds to the next step. It should be noted that the process of generating vibration data in the above step S199 is similar to that in the above step S166, and therefore is not described in detail here.

Next, the processor 81 determines whether or not the first adjustment coefficient is greater than the second adjustment coefficient (step S200). For example, with reference to the first adjustment coefficient data Dd and the second adjustment coefficient data De, the processor 81 compares the value of the first adjustment coefficient with the value of the second adjustment coefficient. Then, when the first adjustment coefficient is less than or equal to the second adjustment coefficient, the processing proceeds to step S201. On the other hand, when the first adjustment coefficient is greater than the second adjustment coefficient, the processing proceeds to step S202.

In step S201, using the first adjustment coefficient, the processor 81 performs an amplitude adjustment process on a staging vibration and performs the process of combining vibration waveforms, and the processing proceeds to step S203. It should be noted that the amplitude adjustment process and the process of combining vibration waveforms in the above step S201 are similar to those in the above step S168, and therefore are not described in detail here.

On the other hand, in step S202, using the second adjustment coefficient, the processor 81 performs an amplitude adjustment process on the staging vibration and performs the process of combining vibration waveforms, and the processing proceeds to step S203. It should be noted that the amplitude adjustment process and the process of combining vibration waveforms in the above step S202 are similar to those in the above step S169, and therefore are not described in detail here.

In step S203, the processor 81 performs the process of, in each cycle of transmitting vibration data, outputting vibration data corresponding to this cycle to the left controller 3 and the right controller 4, and the processing of this subroutine ends. It should be noted that the process of outputting vibration data in the above step S203 is similar to the vibration data transmission process in the above step S170, and therefore is not described in detail here.

Referring back to FIG. 20, when it is determined in the above step S148 that the competition play game mode is not selected, the processor 81 performs game processing in the cooperation play game mode, and the processing proceeds to step S151. With reference to FIG. 24, the game processing in the cooperation play game mode is described below.

In FIG. 24, the processor 81 acquires operation data from the left controller 3 and the right controller 4 and updates the operation data Da (step S211), and the processing proceeds to the next step.

Next, the processor 81 determines whether or not the current moment is during a game (step S212). Then, when the current moment is during a game, including a time immediately after the game is started, the processing proceeds to step S213. On the other hand, when the current moment is not during a game, the processing of this subroutine ends.

In step S213, the processor 81 performs a player object action process, and the processing proceeds to the next step. For example, based on the operation data acquired in the above step S211, the processor 81 sets the content of an instruction regarding the player object PO, and in accordance with the content of the instruction, causes the player object PO to perform an action, thereby updating the player object position data Di. It should be noted that when the player object PO performs the action of increasing an "ally area", then based on the action, the processor 81 enlarges the "ally area", thereby updating the territory data Dm.

Next, the processor 81 performs a cooperation object action process (step S214), and the processing proceeds to the next step. For example, with reference to the communication data Db, the processor 81 acquires data transmitted from the game system operated by the other user participating in the game, and based on the transmitted data, causes the cooperation object (the other player object) operated by the other user to perform an action, thereby updating the cooperation object position data Dk. It should be noted that when the cooperation object performs the action of increasing an "ally area", then based on the action, the processor 81 enlarges the "ally area", thereby updating the territory data Dm.

Next, the processor 81 determines whether or not the current moment is during an enemy appearance event (step S215). For example, when the current moment is the start of an enemy appearance event where the enemy objects EO appear by automatic control, or during an enemy appearance event, the determination is affirmative in the above step S215. Then, when the current moment is during an enemy appearance event, the processing proceeds to step S216. On the other hand, when the current moment is not during an enemy appearance event, the processing proceeds to step S218.

Here, in the determination process in the above step S215, it is determined whether or not the current moment is during an event where the enemy objects EO appear. This assumes that even in the state where the enemy objects EO are not placed on the game field, and the player object PO and the cooperation object cannot compete against the enemy objects EO at the start of the game, then in accordance with the fact that an event where the enemy objects EO appear is started after the game is started, the enemy objects EO, the player object PO, and the cooperation object can enter the state where the enemy objects EO can fight against the player object PO and the cooperation object. In the determination process in the above step S215, when the current moment is during an enemy appearance event, it is determined that the player object PO and the cooperation object are during a fight against the enemy objects EO.

In step S216, the processor 81 performs an enemy object action process, and the processing proceeds to the next step. For example, the processor 81 causes a predetermined number of enemy objects EO to appear on the game field during the enemy appearance event, and based on a predetermined algorithm, also automatically controls the enemy objects EO to perform actions, thereby updating the enemy object position data Dj. It should be noted that when any of the enemy objects EO performs the action of increasing an "enemy area", then based on the action, the processor 81 enlarges the "enemy area", thereby updating the territory data Dm.

Next, in accordance with the elapsed time after the start of the enemy appearance event, the processor 81 performs the process of fading out the first adjustment coefficient from 1.0 to 0.0, and the processing proceeds to step S219. For example, using the first adjustment coefficient indicated by the first adjustment coefficient data Dd, the processor 81 changes the first adjustment coefficient so as to fade out (decrease in a gradually decreasing manner) from 1.0 to 0.0 in accordance with the elapsed time after the start of the enemy appearance event. Then, the processor 81 updates the first adjustment coefficient data Dd using the changed first adjustment coefficient. As an example, the processor 81 changes the first adjustment coefficient so as to fade out from 1.0 to 0.0 for 300 frames (e.g., 5 seconds) from the start of the enemy appearance event.

On the other hand, when it is determined in the above step S215 that the current moment is not during an enemy appearance event, then in accordance with the elapsed time after the end of the enemy appearance event, the processor 81 performs the process of fading in the first adjustment coefficient from 0.0 to 1.0, and the processing proceeds to step S219. For example, using the first adjustment coefficient indicated by the first adjustment coefficient data Dd, the processor 81 changes the first adjustment coefficient so as to fade in (increase in a gradually increasing manner)

from 0.0 to 1.0 in accordance with the elapsed time after the end of the enemy appearance event. Then, the processor 81 updates the first adjustment coefficient data Dd using the changed first adjustment coefficient. As an example, the processor 81 changes the first adjustment coefficient so as to fade in from 0.0 to 1.0 for 300 frames (e.g., 5 seconds) from the end of the enemy appearance event.

In step S219, the processor 81 performs the process of generating vibration data for vibrating each of the left controller 3 and the right controller 4, and the processing proceeds to the next step. It should be noted that the process of generating vibration data in the above step S219 is similar to that in the above step S166, and therefore is not described in detail here.

Next, using the first adjustment coefficient, the processor 81 performs an amplitude adjustment process on a staging vibration and performs the process of combining vibration waveforms (step S220), and the processing proceeds to the next step. It should be noted that the amplitude adjustment process and the process of combining vibration waveforms in the above step S220 are similar to those in the above step S168, and therefore are not described in detail here.

Next, the processor 81 performs the process of, in each cycle of transmitting vibration data, outputting vibration data corresponding to this cycle to the left controller 3 and the right controller 4 (step S221), and the processing of this subroutine ends. It should be noted that the process of outputting vibration data in the above step S221 is similar to that in the above step S170, and therefore is not described in detail here.

Referring back to FIG. 20, in step S151, the processor 81 performs a display control process, and the processing proceeds to the next step. For example, using the player object position data Di, the enemy object position data Dj, and the cooperation object position data Dk, the processor 81 places the player object PO, the enemy objects EO, and/or the cooperation object on the game field. Further, using the territory data Dm, the processor 81 places, on the game field, virtual objects (e.g., liquids different in color, and the like) for distinguishing areas as any of an "ally area", an "enemy area", and a "neutral area", which is neither an "ally area" nor an "enemy area". Then, the processor 81 generates a virtual space image in which the game field is viewed from a virtual camera placed at a predetermined position (e.g., behind the player object PO). Then, the processor 81 performs the process of displaying the virtual space image on a display screen of a display device (e.g., the display 12).

Next, the processor 81 determines whether or not the game is to be ended (step S152). In the above step S152, examples of a condition for ending the game include: the fact that the result of the above game is settled; and the fact that the user performs the operation of ending the game. When the game is not to be ended, the processing returns to the above step S145, and the process of step S145 is repeated. When the game is to be ended, the processing of the flow chart ends. Hereinafter, the series of processes of steps S145 to S152 is repeatedly executed until it is determined in step S152 that the game is to be ended.

As described above, in the exemplary embodiment, a vibration signal is generated by associating a plurality of types of vibrations with a plurality of states of the player object PO, thereby vibrating the left controller 3 and the right controller 4. Then, when it is determined that the player object PO is in a predetermined situation (e.g., is during a fight against the enemy objects EO), a vibration signal is generated so that regarding a staging vibration among the plurality of types of vibrations, the vibration is weaker than in a case where it is not determined that the player object PO is in the predetermined situation, or the vibration disappears. Thus, in the predetermined situation, it is possible to cause the user to perceive a vibration regarding a game element among the plurality of types of vibrations in an easily understandable manner.

It should be noted that in the above exemplary embodiment, an example has been used where a game mode is selected and set before the start of a game. The game mode, however, may be able to be changed even during the game. As an example, the configuration may be such that a predetermined operation is performed, thereby displaying options for a game mode and suspending a game. Then, in accordance with the fact that an option is selected during the suspension of the game, the game mode can be switched. In this case, when the game mode is switched, parameters such as an adjustment coefficient may be initialized.

Further, in the above exemplary game, an example has been used where play is performed using the unified apparatus obtained by attaching the left controller 3 and the right controller 4 to the main body apparatus 2. Alternatively, play may be performed in the state where the left controller 3 and the right controller 4 are detached from the main body apparatus 2. For example, to impart vibrations to the left controller 3 and the right controller 4 when game play is performed in the state where the user holds the left controller 3 with their left hand and holds the right controller 4 with their right hand, then when the player object PO is in a predetermined situation, vibration control may be performed so that a staging vibration is weakened, or the staging vibration disappears. In this case, a game image may be displayed on the display 12 of the main body apparatus 2, or a game image may be displayed on a display screen of the stationary monitor by attaching the main body apparatus 2 alone to the cradle.

Further, in the above exemplary embodiment, the main body apparatus 2 performs the process of adjusting the amplitudes of vibration data based on vibration data for the left controller 3 and vibration data for the right controller 4. Alternatively, another apparatus may perform this process. For example, the process of adjusting the amplitudes of the vibration data may be performed by the left controller 3 and/or the right controller 4 that are to vibrate using the vibration data. In this case, the main body apparatus 2 transmits vibration data and an adjustment coefficient for adjusting the amplitude to the target controller, whereby the process of adjusting the amplitude of vibration data can be performed by the controller.

Further, in the above exemplary embodiment, an example has been used where a single user performs game play using the left controller 3 and/or the right controller 4. Alternatively, a case is also possible where a plurality of users perform game play. In this case, to each of the left controller 3 and/or the right controller 4 used by each user, a vibration corresponding to the state of a player object operated by the user may be imparted. Further, when game play can be performed using a single game controller different from the left controller 3 and the right controller 4, the intensity of a vibration to be imparted to the single game controller may be adjusted in accordance with the state of a player object.

Further, in the above exemplary embodiment, an example has been used where the amplitude of a vibration is adjusted in accordance with the state of a player object. Alternatively, the frequency of a vibration may be adjusted. For example, operation devices have different resonance frequency characteristics depending on the shape, the size, the weight, the material, and the like of an operation device used for an operation. Further, depending on an operation device used for an operation, a case is also possible where there are a frequency range where the user operating the operation device is likely to feel a vibration, and a frequency range where the user is less likely to feel a vibration. To avoid such a resonance frequency specific to an operation device, such a frequency range where a vibration is likely to be felt, and/or such a frequency range where a vibration is less likely to be felt, or to positively aim this resonance frequency and/or this frequency range, the frequency of a vibration may be adjusted. Further, depending on the configuration of an operation device, a case is possible where a vibration having a relatively high frequency is likely to be felt, or a case where a vibration having a relatively low frequency is likely to be felt. In such a case, in accordance with the state of the player object, the frequency of a vibration to be imparted to the operation device may be shifted to a relatively high frequency or a relatively low frequency, thereby adjusting the frequency. Further, the adjustment of the frequency of a vibration may be added to the above adjustment of the amplitude of a vibration corresponding to the state of the player object.

Further, in the above exemplary embodiment, as an example of a predetermined situation of the player object PO for weakening a staging vibration or setting the staging vibration to 0, the state where the player object PO is during a fight against the enemy object EO is used. Alternatively, when the player object PO is in another state, the staging vibration may be weakened or set to 0. For example, in the situation where there is a possibility that the progression of the game will be hindered by generating the staging vibration such as, in addition to the state where the player object PO is during a game against another object as described above, the state where the player object PO generates an elaborate object (e.g., the work of assembling a delicate object, the input of a character, a line, or a figure, or the like), the state where the player object PO is required to perform a more accurate action, or the state where the player object PO distinguishes a sound or a vibration, it may be determined that the player object PO is in the predetermined situation.

Further, in another exemplary embodiment, the main body apparatus 2 may be able to directly communicate with the stationary monitor. For example, the main body apparatus 2 and the stationary monitor may be able to directly perform wired communication with each other, or directly perform wireless communication with each other. In this case, based on whether or not the main body apparatus 2 and the stationary monitor can directly communicate with each other, the main body apparatus 2 may determine the display destination of an image.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the game system 1 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the game system 1 performs information processing (game processing) and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment provides a game system, a game program, a game apparatus, and a game processing method that are capable of imparting an appropriate vibration to a user in accordance with the use form of an apparatus including a vibrator.

What is claimed is:

1. A game system including a controller, a vibrator, and an information processing unit, the information processing unit comprising a computer configured to at least:
    based on a user operation on the controller, control an operation target in a virtual space;
    determine whether the operation target is in a predetermined situation in the virtual space; and
    in accordance with a state of the operation target in the virtual space, generate a vibration signal configured to cause the vibrator to vibrate in accordance with a first type of vibration, the state of the operation target being one of a plurality of possible states of the operation target, each of the possible states of the operation target being associated with one of a plurality of possible types of vibrations, the possible states being different from the predetermined situation,
    wherein when it is determined that the operation target is in the predetermined situation and the vibration signal is being generated to cause the vibrator to vibrate in accordance with the first type of vibration, the vibration signal is generated to cause the vibrator to vibrate according to the first type of vibration in a manner that is weakened compared to a case where it is not determined that the operation target is in the predetermined situation.

2. The game system according to claim 1, wherein:
    in the control of the operation target, a player character object in the virtual space is controlled as the operation target,
    the computer of the information processing unit is further configured to control a behavior of an enemy object attacking the player character object in the virtual space, and
    based on a state of the enemy object, it is determined whether the player character object is in a fight, and when the player character object is in the fight, it is determined that the player character object is in the predetermined situation.

3. The game system according to claim 2, wherein:
    in the control of the enemy object, based on a predetermined condition, a process for the enemy object to attack the player character object is started, and
    when the process for the enemy object to attack the player character object is performed in the control of the enemy object, it is determined that the player character object is in the fight.

4. The game system according to claim 2, wherein when a distance between the enemy object and the player character object in the virtual space is smaller than a predetermined value, it is determined that the player character object is in the fight.

5. The game system according to claim 1, wherein
    in the control of the operation target, after a predetermined start timing, based on a user operation on the controller, a player character object in the virtual space is controlled as the operation target, and
    after a predetermined time elapses from the start timing, it is determined that the player character object is in a fight, and when the player character object is in the fight, it is determined that the player character object is in the predetermined situation.

6. The game system according to claim 5, wherein the computer of the information processing unit is further configured to:
    perform wireless or wired communication with another game system; and
    after the start timing and based on data from the other game system acquired in the performance of the communication, control another player character object operated by another user.

7. The game system according to claim 1, wherein when an event where the operation target becomes damaged occurs in the virtual space, the vibration signal is generated to cause the vibrator to vibrate in accordance with a second type of vibration other than the first type of vibration.

8. The game system according to claim 1, wherein when the operation target attacks another target in the virtual space, the vibration signal is generated to cause the vibrator to vibrate in accordance with a second type of vibration other than the first type of vibration.

9. The game system according to claim 1, wherein when the operation target enters an area satisfying a first condition in the virtual space, the vibration signal is generated to cause the vibrator to vibrate in accordance with a predetermined vibration as the first type of vibration.

10. The game system according to claim 1, wherein when the operation target enters an area satisfying a second condition in the virtual space, the vibration signal is generated to cause the vibrator to vibrate in accordance with a second type of vibration other than the first type of vibration.

11. The game system according to claim 1, wherein when the operation target moves in the virtual space, the vibration signal is generated to cause the vibrator to vibrate in accordance with a predetermined vibration as the first type of vibration.

12. The game system according to claim 1, wherein in a predetermined period after it is determined that the operation target is in the predetermined situation, an intensity of the first type of vibration weakens with a lapse of time.

13. The game system according to claim 1, wherein in the generation of the vibration signal,
    a vibration signal indicating a vibration waveform of a vibration corresponding to the state of the operation target is generated, and
    when a plurality of vibrations are simultaneously generated in accordance with the state of the operation target, a vibration signal indicating a waveform obtained by combining vibration waveforms of the vibrations is generated.

14. The game system according to claim 1, wherein:
    in the control of the operation target, after a predetermined start timing, based on a user operation on the controller, a player character object in the virtual space is controlled as the operation target, the computer of the information processing unit is further configured to, after the start timing, cause an enemy object attacking the player character object to appear in the virtual space, and after the enemy object appears in the virtual space, it is determined that the player character object is in a fight, and when the player character object is in the fight, it is determined that the player character object is in the predetermined situation.

15. A non-transitory computer-readable storage medium having stored therein a game program executable by a computer included in an apparatus for vibrating a vibrator, the game program, when executed, causing the computer to at least:

based on a user operation on a controller, control an operation target in a virtual space;

determine whether the operation target is in a predetermined situation in the virtual space; and in accordance with a state of the operation target in the virtual space, generate a vibration signal configured to cause the vibrator to vibrate in accordance with a first type of vibration, the state of the operation target being one of a plurality of possible states of the operation target, each of the possible states of the operation target being associated with one of a plurality of possible types of vibrations, the possible states being different from the predetermined situation, wherein when it is determined that the operation target is in the predetermined situation and the vibration signal is being generated to cause the vibrator to vibrate in accordance with the first type of vibration, the vibration signal is generated to cause the vibrator to vibrate according to the first type of vibration in a manner that is weakened compared to a case where it is not determined that the operation target is in the predetermined situation.

16. The non-transitory computer-readable storage medium having stored therein the game program according to claim 15, wherein:

in the control of the operation target, a player character object in the virtual space is controlled as the operation target, a behavior of an enemy object attacking the player character object in the virtual space is controlled, and based on a state of the enemy object, it is determined whether the player character object is in a fight, and when the player character object is in the fight, it is determined that the player character object is in the predetermined situation.

17. The non-transitory computer-readable storage medium having stored therein the game program according to claim 15, wherein:

in the control of the enemy object, based on a predetermined condition, a process for the enemy object to attack the player character object is started, and when the process for the enemy object to attack the player character object is performed in the control of the enemy object, it is determined that the player character object is in the fight.

18. The non-transitory computer-readable storage medium having stored therein the game program according to claim 16, wherein when a distance between the enemy object and the player character object in the virtual space is smaller than a predetermined value, it is determined that the player character object is in the fight.

19. The non-transitory computer-readable storage medium having stored therein the game program according to claim 15, wherein:

in the control of the operation target, after a predetermined start timing, based on a user operation on the controller a player character object in the virtual space is controlled as the operation target, and after a predetermined time elapses from the start timing, it is determined that the player character object is in a fight, and when the player character object is in the fight, it is determined that the player character object is in the predetermined situation.

20. The non-transitory computer-readable storage medium having stored therein the game program according to claim 19, wherein:

wireless or wired communication is performed with another game system; and after the start timing and based on data from the other game system acquired in the performance of the communication, another player character object operated by another user is controlled via execution of the game program.

21. The non-transitory computer-readable storage medium having stored therein the game program according to claim 15, wherein when an event where the operation target becomes damaged occurs in the virtual space, the vibration signal is generated to cause the vibrator to vibrate in accordance with a second type of vibration other than the first type of vibration.

22. The non-transitory computer-readable storage medium having stored therein the game program according to claim 15, wherein when the operation target attacks another target in the virtual space, the vibration signal is generated to cause the vibrator to vibrate in accordance with a second type of vibration other than the first type of vibration.

23. The non-transitory computer-readable storage medium having stored therein the game program according to claim 15, wherein when the operation target enters an area satisfying a first condition in the virtual space, the vibration signal is generated to cause the vibrator to vibrate in accordance with a predetermined vibration as the first type of vibration.

24. The non-transitory computer-readable storage medium having stored therein the game program according to claim 15, wherein when the operation target enters an area satisfying a second condition in the virtual space, the vibration signal is generated to cause the vibrator to vibrate in accordance with a second type of vibration other than the first type of vibration.

25. The non-transitory computer-readable storage medium having stored therein the game program according to claim 15, wherein when the operation target moves in the virtual space, the vibration signal is generated to cause the vibrator to vibrate in accordance with a predetermined vibration as the first type of vibration.

26. The non-transitory computer-readable storage medium having stored therein the game program according to claim 15, wherein in a predetermined period after it is determined that the operation target is in the predetermined situation, an intensity of the first type of vibration weakens with a lapse of time.

27. The non-transitory computer-readable storage medium having stored therein the game program according to claim 15, wherein:

a vibration signal indicating a vibration waveform of a vibration corresponding to the state of the operation target is generated, and when a plurality of vibrations are simultaneously generated in accordance with the state of the operation target, a vibration signal indicating a waveform obtained by combining vibration waveforms of the vibrations is generated.

28. The non-transitory computer-readable storage medium having stored therein the game program according to claim 15, wherein:

in the control of the operation target, after a predetermined start timing, based on a user operation on the controller, a player character object in the virtual space is controlled as the operation target, after the start timing, an enemy object attacking the player character object is caused to appear in the virtual space, and after the enemy object appears in the virtual space, it is determined that the player character object is in a fight, and when the player character object is in the fight, it is determined that the player character object is in the predetermined situation.

29. A game apparatus configured to vibrate a vibrator, the game apparatus comprising a computer configured to at least:

based on a user operation on a controller, control an operation target in a virtual space;

determine whether the operation target is in a predetermined situation in the virtual space; and in accordance with a state of the operation target in the virtual space, generate a vibration signal configured to cause the vibrator to vibrate in accordance with a first type of vibration, the state of the operation target being one of a plurality of possible states of the operation target, each of the possible states of the operation target being associated with one of a plurality of possible types of vibrations, the possible states being different from the predetermined situation, wherein when it is determined that the operation target is in the predetermined situation and the vibration signal is being generated to cause the vibrator to vibrate in accordance with the first type of vibration, the vibration signal is generated to cause the vibrator to vibrate according to the first type of vibration in a manner that is weakened compared to a case where it is not determined that the operation target is in the predetermined situation.

30. The game apparatus according to claim 29, wherein:
in the control of the operation target, a player character object in the virtual space is controlled as the operation target, the computer of the information processing unit is further configured to control a behavior of an enemy object attacking the player character object in the virtual space, and based on a state of the enemy object, it is determined whether the player character object is in a fight, and when the player character object is in the fight, it is determined that the player character object is in the predetermined situation.

31. The game apparatus according to claim 30, wherein:
in the control of the enemy object, based on a predetermined condition, a process for the enemy object to attack the player character object is started, and when the process for the enemy object to attack the player character object is performed in the control of the enemy object, it is determined that the player character object is in the fight.

32. The game apparatus according to claim 30, wherein when a distance between the enemy object and the player character object in the virtual space is smaller than a predetermined value, it is determined that the player character object is in the fight.

33. A game processing method for vibrating a vibrator, the game processing method comprising:

based on a user operation on a controller, controlling an operation target in a virtual space;

determining whether the operation target is in a predetermined situation in the virtual space; and in accordance with a state of the operation target in the virtual space, generating a vibration signal configured to cause the vibrator to vibrate in accordance with a first type of vibration, the state of the operation target being one of a plurality of possible states of the operation target, each of the possible states of the operation target being associated with one of a plurality of possible types of vibrations, the possible states being different from the predetermined situation, wherein when it is determined that the operation target is in the predetermined situation and the vibration signal is being generated to cause the vibrator to vibrate in accordance with the first type of vibration, the vibration signal is generated to cause the vibrator to vibrate according to the first type of vibration in a manner that is weakened compared to a case where it is not determined that the operation target is in the predetermined situation.

34. The game processing method according to claim 33, wherein:

in the control of the operation target, a player character object in the virtual space is controlled as the operation target, the game processing method further comprises controlling a behavior of an enemy object attacking the player character object in the virtual space, and based on a state of the enemy object, it is determined whether the player character object is in a fight, and when the player character object is in the fight, it is determined that the player character object is in the predetermined situation.

35. The game processing method according to claim 34, wherein:

in the control of the enemy object, based on a predetermined condition, a process for the enemy object to attack the player character object is started, and when the process for the enemy object to attack the player character object is performed in the control of the enemy object, it is determined that the player character object is in the fight.

36. The game processing method according to claim 34, wherein when a distance between the enemy object and the player character object in the virtual space is smaller than a predetermined value, it is determined that the player character object is in the fight.

* * * * *